United States Patent
Frueh et al.

(10) Patent No.: US 10,269,177 B2
(45) Date of Patent: Apr. 23, 2019

(54) HEADSET REMOVAL IN VIRTUAL, AUGMENTED, AND MIXED REALITY USING AN EYE GAZE DATABASE

(71) Applicant: Google Inc., Mountain View, CA (US)

(72) Inventors: Christian Frueh, Mountain View, CA (US); Vivek Kwatra, Bangalore (IN); Avneesh Sud, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 15/616,634

(22) Filed: Jun. 7, 2017

(65) Prior Publication Data

US 2018/0101227 A1  Apr. 12, 2018

Related U.S. Application Data

(60) Provisional application No. 62/404,972, filed on Oct. 6, 2016.

(51) Int. Cl.
*G06F 3/01* (2006.01)
*G06K 9/00* (2006.01)
(Continued)

(52) U.S. Cl.
CPC ........ *G06T 17/205* (2013.01); *G02B 27/0172* (2013.01); *G06F 3/013* (2013.01);
(Continued)

(58) Field of Classification Search
None
See application file for complete search history.

(56) References Cited

U.S. PATENT DOCUMENTS

2012/0290401 A1  11/2012  Neven
2014/0093187 A1   4/2014  Yehezkel et al.
(Continued)

FOREIGN PATENT DOCUMENTS

WO   2015185537 A1   6/2016

OTHER PUBLICATIONS

U.S. Appl. No. 15/616,604, filed Jun. 19, 2017, listing Christian Frueh et al. as inventors, entitled "Headset Removal in Virtual, Augmented, and Mixed Reality Using an Eye Gaze Database".
(Continued)

*Primary Examiner* — YuJang Tswei

(57) ABSTRACT

A camera captures an image of a user wearing a head mounted device (HMD) that occludes a portion of the user's face. A three-dimensional (3-D) pose that indicates an orientation and a location of the user's face in a camera coordinate system is determined. A representation of the occluded portion of the user's face is determined based on a 3-D model of the user's face. The representation replaces a portion of the HMD in the image based on the 3-D pose of the user's face in the camera coordinate system. In some cases, the 3-D model of the user's face is selected from 3-D models of the user's face stored in a database that is indexed by eye gaze direction. Mixed reality images can be generated by combining virtual reality images, unoccluded portions of the user's face, and representations of an occluded portion of the user's face.

24 Claims, 21 Drawing Sheets

(51) Int. Cl.

| | |
|---|---|
| *G06T 7/73* | (2017.01) |
| *G02B 27/01* | (2006.01) |
| *G06F 17/30* | (2006.01) |
| *G06T 15/04* | (2011.01) |
| *G06T 15/40* | (2011.01) |
| *G06T 17/00* | (2006.01) |
| *G06T 17/20* | (2006.01) |
| *G06T 19/00* | (2011.01) |
| *G06T 19/20* | (2011.01) |
| *G06T 7/246* | (2017.01) |

(52) U.S. Cl.
CPC ...... *G06F 17/3025* (2013.01); *G06F 17/3028* (2013.01); *G06F 17/30256* (2013.01); *G06K 9/00255* (2013.01); *G06K 9/00288* (2013.01); *G06K 9/00604* (2013.01); *G06T 7/248* (2017.01); *G06T 7/74* (2017.01); *G06T 15/04* (2013.01); *G06T 15/40* (2013.01); *G06T 17/00* (2013.01); *G06T 19/006* (2013.01); *G06T 19/20* (2013.01); *G06T 2200/04* (2013.01); *G06T 2200/08* (2013.01); *G06T 2207/10028* (2013.01); *G06T 2207/30201* (2013.01); *G06T 2207/30204* (2013.01); *G06T 2219/2004* (2013.01); *G06T 2219/2021* (2013.01)

(56) References Cited

U.S. PATENT DOCUMENTS

| | | | | |
|---|---|---|---|---|
| 2014/0359656 | A1* | 12/2014 | Banica | H04N 21/812 725/32 |
| 2015/0243069 | A1 | 8/2015 | Knoblauch et al. | |
| 2015/0310263 | A1 | 10/2015 | Zhang et al. | |
| 2016/0026253 | A1 | 1/2016 | Bradski et al. | |
| 2016/0217621 | A1 | 7/2016 | Raghoebardajal et al. | |
| 2016/0341959 | A1* | 11/2016 | Gibbs | G06K 9/00671 |
| 2018/0018819 | A1 | 1/2018 | Hwang et al. | |

OTHER PUBLICATIONS

U.S. Appl. No. 15/616,619, filed Jun. 7, 2017, listing Christian Frueh et al. as inventors, entitled "Headset Removal in Virtual, Augmented, and Mixed Reality Using an Eye Gaze Database".

Xavier P. Burgos-Artizzu, et al., "Real-Time Expression-Sensitive HMD Face Reconstruction", SA '15 SIGGRAPH Asia 2015 Technical Briefs Article No. 9, Nov. 2-6, 2015, 4 pages.

Sud, A., Blog .Google, <https://blog.google/products/google-vr/google-research-and-daydream-labs-seeing-eye-eye-mixed-reality/> Accessed Feb. 22, 2017, 6 pages.

Kwatra, V., Google Research Blog, <https://research.googleblog.com/2017/02/headset-removal-for-virtual-and-mixed.html>, Accessed Feb. 22, 2017, 11 pages.

M. Takemura et al., "Diminishing Head-Mounted Display for Shared Mixed Reality", Institute of Engineering Mechanics and Systems Tsukuba, Sep. 30-Oct. 1, 2002, 8 pages.

Justus Thies, et al., "FaceVR: Real-Time Facial Reenactment and Eye Gaze Control in Virtual Reality", arXiv preprint 1610.03151v1, Oct. 11, 2016, 13 pages.

Kert Gartner, Making High Quality Mixed Reality VR Trailers and Videos, <http://www.kertgartner.com/making-mixed-reality-vr-trailers-and-videos/>, Apr. 5, 2017, 20 pages.

International Search Report and Written Opinion dated Nov. 20, 2017 for PCT/US17/040739, 18 pages.

Kenneth Alberto Funes Mora, et al., "EYEDIAP: A Database for the Development and Evaluation of Gaze Estimation Algorithms from RGB and RGB-D Cameras", Eye Tracking Research and Applications, Mar. 26, 2014, 4 pages.

Christian Frueh, et al., "Headset removal for virtual and mixed reality", ACM Siggraph 2017 Talks, Jun. 30, 2017, 2 pages.

Hao Li, et al., "Facial performance sensing head-mounted display", ACM Transactions on Graphics, vol. 34, No. 4, Jul. 27, 2015, 9 pages.

Non-Final Office Action dated Mar. 26, 2018 for U.S. Appl. No. 15/616,604, 39 pages.

Non-Final Office Action dated Oct. 30, 2018 for U.S. Appl. No. 15/616,619, 30 pages.

Final Office Action dated Aug. 6, 2018 for U.S. Appl. No. 15/616,604, 29 pages.

* cited by examiner

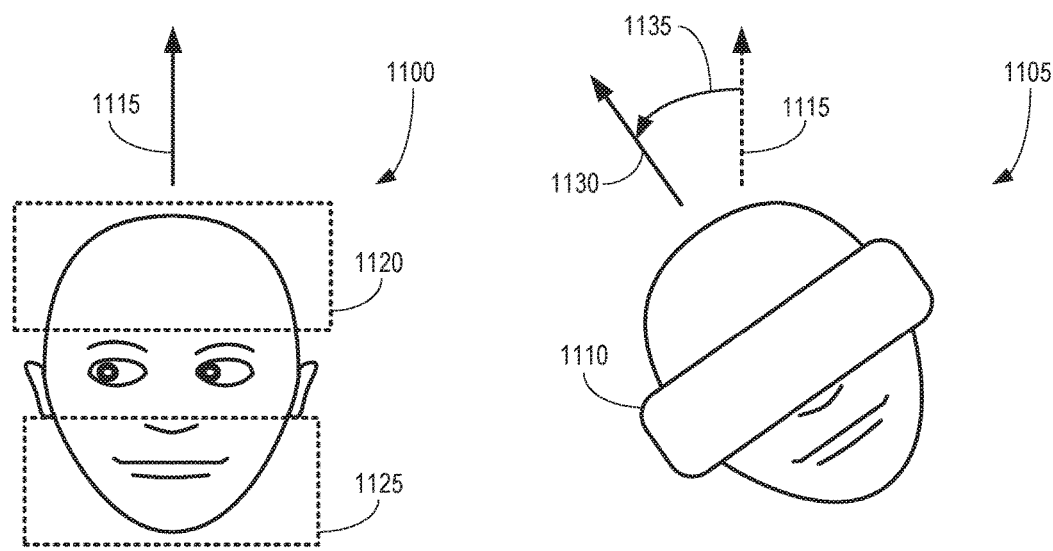
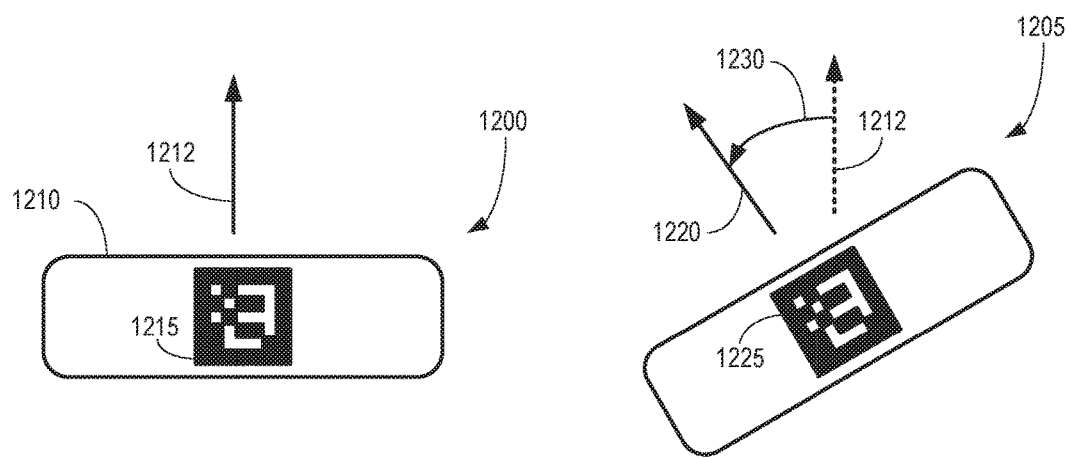
FIG. 11
FIG. 12

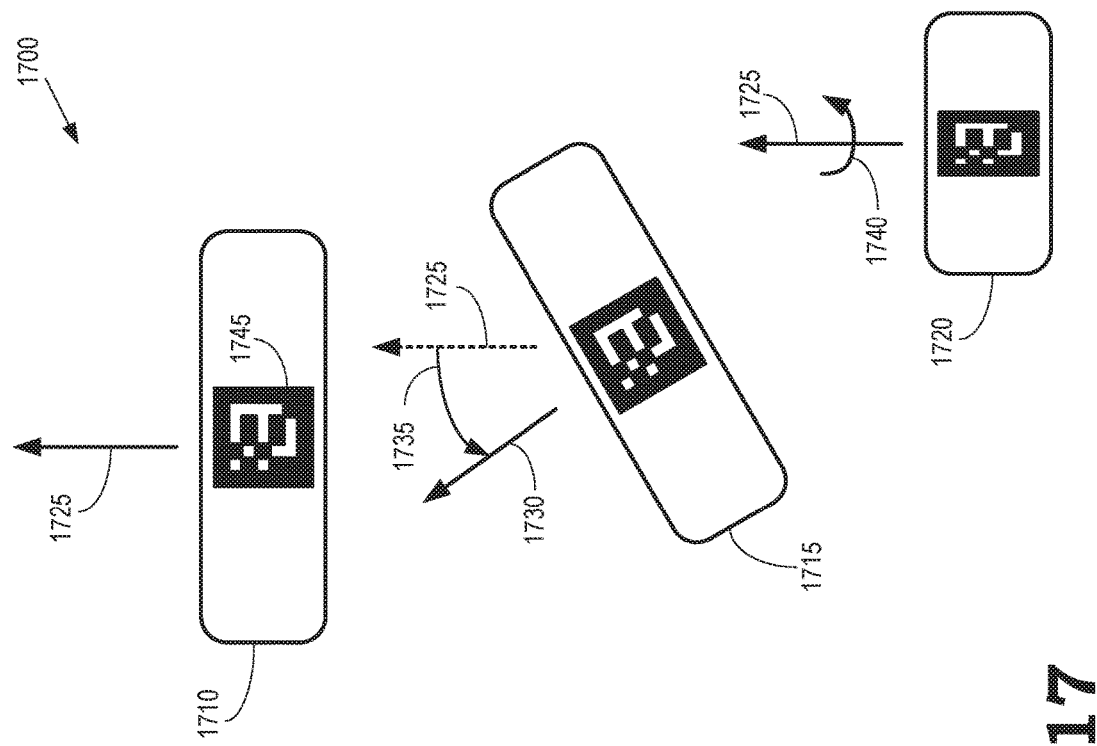
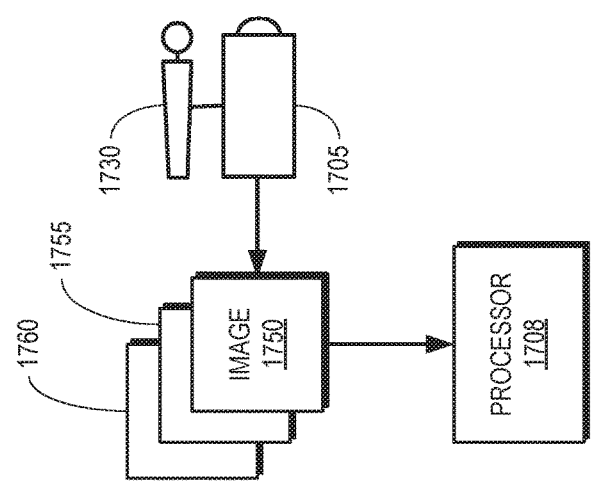
FIG. 17

HEADSET REMOVAL IN VIRTUAL, AUGMENTED, AND MIXED REALITY USING AN EYE GAZE DATABASE

CROSS REFERENCE TO RELATED APPLICATIONS

This application is related to U.S. patent application Ser. No. 15/616,604, entitled "HEADSET REMOVAL IN VIRTUAL, AUGMENTED, AND MIXED REALITY USING AN EYE GAZE DATABASE" and filed on Jun. 7, 2017 and U.S. patent application Ser. No. 15/616,619, entitled "HEADSET REMOVAL IN VIRTUAL, AUGMENTED, AND MIXED REALITY USING AN EYE GAZE DATABASE" filed on Jun. 7, 2017.

BACKGROUND

Immersive virtual reality (VR), augmented reality (AR), or mixed reality (MR) systems typically utilize a head mounted display (HMD) that presents stereoscopic imagery to the user so as to give a sense of presence in a three-dimensional (3D) scene. A typical HMD is designed to produce a stereoscopic image over a field-of-view that approaches or is equal to the field-of-view of a human eye, which is approximately 180°. For example, the field-of-view of commercial HMDs is currently 100-110°. Multiple users can interact with each other in the same 3-D scene produced by an immersive VR, AR, or MR system. For example, users can interact with each other using 3D video conferencing, while co-watching movies or YouTube videos in a virtual theater, taking a virtual hike through a region in Google Earth, or while sitting in a virtual 3D classroom listening to a lecture by a (real or virtual) professor. Some immersive VR, AR, or MR systems use a camera to capture images of the users, which are then inserted into the virtual 3-D scene. In some cases, such as systems that implement avatar-based representations, the "camera" is an abstraction that is used to indicate a point of view from which the scene is rendered. In cases where the scene includes a user wearing an HMD, the camera is typically located outside of the HMD and renders or captures the scene from an external point of view, relative to the user wearing the HMD. Consequently, the user's faces, and in particular the user's eyes, are obscured by the HMD so that the images of the users that are inserted into the virtual 3-D scene have a disconcerting "brick-in-the-face" appearance. Consequently, the HMDs prevent the users from making eye contact during virtual interactions, which can disrupt the sense of immersion and social connection between the users in the virtual 3-D scene.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

FIG. 11 illustrates matching a 3-D model of a face to a captured image of a face that is partially occluded by an HMD according to some embodiments.

FIG. 12 illustrates matching a 3-D model of an HMD to a captured image of an HMD according to some embodiments.

FIG. 17 is a diagram illustrating an arrangement that is used to perform automatic calibration between a camera and a pose of an HMD according to some embodiments.

DETAILED DESCRIPTION

Figure 1:
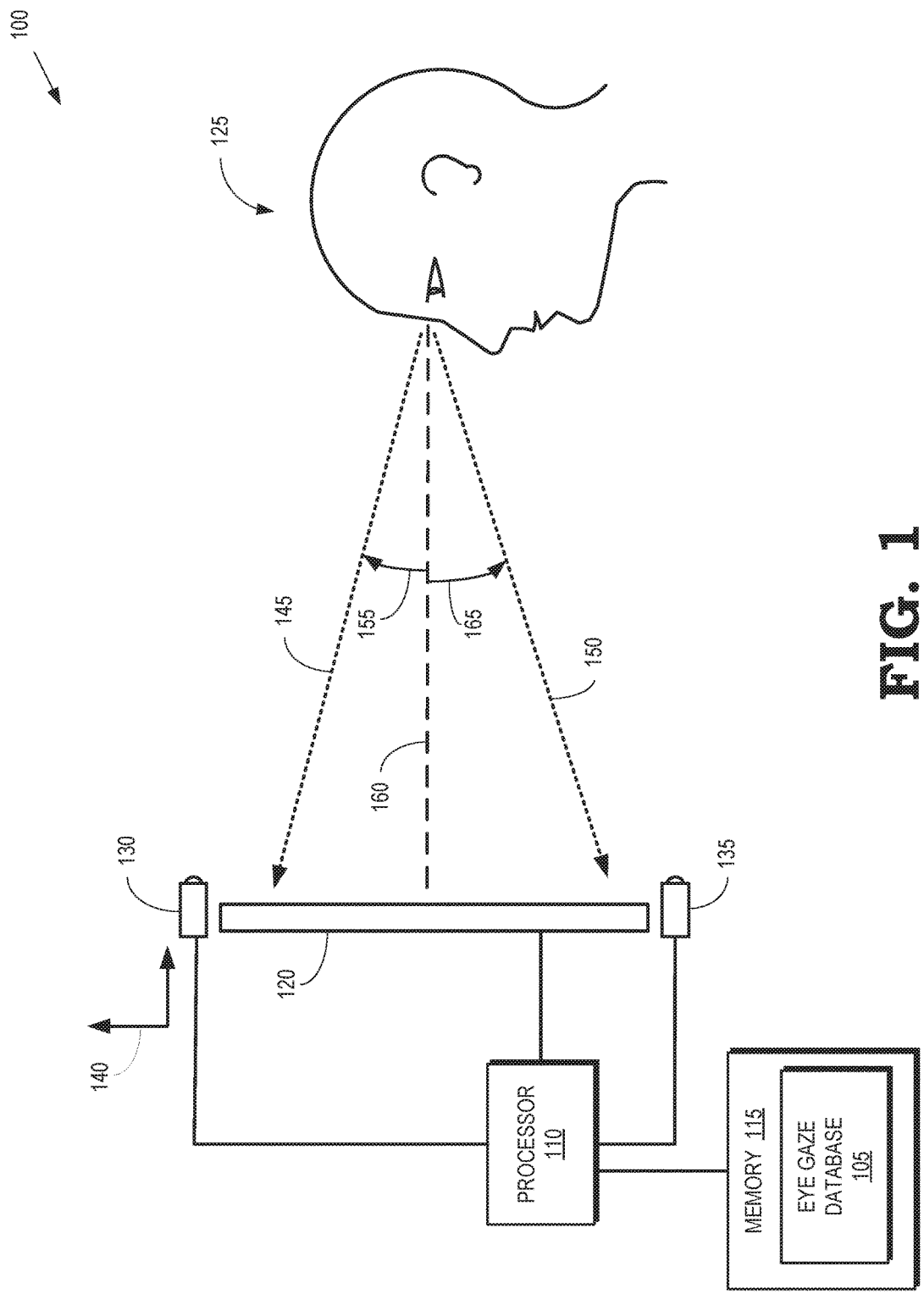
FIG. 1 is a block diagram illustrating a side view of a computer system that is configured to capture an eye gaze database according to some embodiments.

The social connection between users in a virtual 3-D scene, such as a mixed reality scene, can be significantly enhanced by replacing a portion of the HMD with a model of a portion of the user's face that is obscured by the HMD in the image of the user that is inserted into the virtual 3-D scene. Some embodiments of the system include three components: (1) generating an eye gaze database for a 3-D model of a user's face that is indexed by the user's eye gaze direction, (2) "removing" the HMD from an image of the user by overwriting a portion of the image corresponding to the HMD with a portion of the 3-D model rendered based on the user's pose and eye gaze direction, and (3) generating a mixed reality image of a user including a translucent representation of the HMD that is created based on a rendered 3-D model of a portion of the user's face and time synchronized streams representative of HMD pose telemetry, the user's eye gaze direction, and images captured by an external camera.

A 3-D model of the user's face is generated by capturing a plurality of images of the user's face corresponding to a plurality of different eye gaze directions. In some embodiments, a camera captures the plurality of images while the user follows a moving target image on a screen. For example, the camera can be implemented as an RGBD camera that captures RGB values of pixels in the image and a depth value for each pixel that indicates a distance between the camera and the object represented by the pixel. The eye gaze direction for each image is then determined based on the relative positions of the user's eyes, the camera, and the moving target image on the screen. The camera also captures an image while the user is blinking. Face samples are calculated for each image by defining locations of vertices in the face sample using the depth values for the pixels in the image and texture values are defined for each vertex using the RGB values of the corresponding pixel. The face samples for the different images are then aligned, e.g., using an iterative closest point (ICP) algorithm, filtered, and combined to generate a reference 3-D model of the user's face. The textures for each of the face samples are then remapped to align with the reference 3-D model. The reference model and the face samples corresponding to different eye gaze directions, as well as the face sample for the blinking user, are stored as an eye gaze database that is indexed by eye gaze direction.

A portion of an HMD that obscures a user's eyes is removed from an image of the user captured by a camera by determining a 3-D pose that indicates an orientation and a location of the user's face with respect to the camera and rendering a portion of a 3-D model of the user's face into the image to replace the portion of the HMD. In some embodiments, the eye gaze of the user is determined by an eye tracker implemented in the HMD and the tracked eye gaze is used to select the appropriate 3-D model of the user's face (or texture used to render a portion of the user's face) from the database, which is indexed by eye gaze direction. The 3-D pose of the user's face relative to the camera is determined based on a transform of the HMD coordinate system to the camera coordinate system, the HMD pose in the HMD coordinate system, and the 3-D pose of the user's face relative to the HMD. The camera-to-HMD transform is determined by matching a model of the HMD to the image captured by the camera. The 3-D pose of the user's face relative to the HMD is determined by matching an unoccluded portion of the user's face (e.g., the chin or forehead of the user's face) to the image of the user captured by the camera. For example, the 3-D pose can be determined using ICP matching of the unoccluded portions of the user's face in the image to the 3-D model rendered at different orientations corresponding to different candidate 3-D poses. The 3-D pose of the user's face relative to the camera is then fully determined if the HMD provides pose data, e.g., an Oculus Rift or HTC Vive provides 6 Degree of Freedom (6DoF) pose data. However, if the HMD does not provide pose data, e.g., Google Cardboard or Daydream View provides only 3DoF pose data or no pose data at all, the HMD pose in the HMD coordinate system is determined by a matching process performed in real time for each image.

Once the 3-D pose of the user's face relative to the camera is determined, a portion of the 3-D model of the user's face corresponding to the occluded portions of the user's face is rendered from the perspective of the camera. The portion of the 3-D model of the user's face is rendered using texture samples selected from an eye gaze database. In some embodiments, the HMD includes an eye tracker that detects an eye gaze direction corresponding to each image and the eye gaze direction is used as an index to identify texture samples in the eye gaze database that are used to render the portion of the 3-D model. In some embodiments, the texture samples are color corrected using an affine transform in RGB space that maps colors of the texture samples to colors of an unoccluded portion of the user's face in the image captured by the camera. In some embodiments, a translucence (a) of the rendered portion of the 3-D model of the user's face varies from a center to an edge of the rendered portion. For example, the translucence (a) can be varied from a value of 1 (e.g., the HMD is completely transparent) at the center of the HMD to a value of zero (e.g., the HMD is completely opaque) at the edges of the HMD.

In a mixed reality system, actual images of a user (and other objects in a physical scene) are combined with virtual images (which can include avatars of users) to create a mixed reality scene. An HMD worn by the user is (at least partially) removed from an image of the user that is captured by a camera and presented in the mixed reality scene by rendering a portion of a 3-D model of the user's face based on an eye gaze direction of the user and a pose of the HMD relative to the camera. Pixels in the rendered portion of the 3-D model are used to overwrite corresponding pixels representative of the HMD in the image. In some embodiments, the pose of the HMD relative to the RGB camera is determined by tracking distinguishable features on a surface of the HMD in the image captured by the camera. For example, Aruco markers can be placed on the HMD and the pose of the HMD can be tracked relative to the camera by detecting the Aruco marker in the images captured by the camera. Signal streams representative of the HMD pose telemetry and the images captured by the camera are synchronized by cross correlating motion of tracked features in the images captured by the camera with corresponding motion of the HMD indicated by the HMD pose telemetry. A signal stream representative of the eye gaze direction of the user is synchronized with the HMD pose telemetry using a clock that is shared by the HMD and an eye tracker or, alternatively, by cross correlating the HMD pose telemetry and eye gaze directions during predetermined motion of the user wearing the HMD.

FIG. 1 is a block diagram illustrating a side view 100 of a computer system that is configured to capture an eye gaze database 105 according to some embodiments. The computer system includes a processor 110 and a memory 115. The processor 110 is used to execute instructions stored in the memory 115 and to store information in the memory 115 such as the results of the executed instructions. For example, the memory 115 can store the eye gaze database 105 that is generated by the processor 110. The processor 110 is connected to a screen 120 that is configured to display images to a user 125 based on information provided to the screen 120 by the processor 110. For example, the processor 110 can generate values of pixels representative of an image and provide the pixel values to the screen 120, which uses the pixel values to control properties of the light emitted by pixels of the screen 120 to generate the image.

A camera 130 is used to capture images of the user 125 and provide information representative of the captured images to the processor 110. Some embodiments of the camera 130 are implemented as a Red-Green-Blue-Depth (RGBD) camera that generates RGB values for a set of camera pixels based on light incident on light collecting elements in the camera 130 such as charge couple devices (CCDs). The RGBD camera 130 also determines depth values for each of the camera pixels. The depth values represent a distance from the RGBD camera 130 to the portion of the scene that is represented by the corresponding camera pixel. Some embodiments of the RGBD camera 130 include an infrared source to illuminate the scene with an infrared speckle pattern and an infrared sensor to capture reflected infrared light. The RGBD camera 130 can use well-known algorithms to determine the depths associated with each camera pixel based on the reflected infrared light.

An eye tracker 135 is used to track movements and positions of the eyes of the user 125 by measuring the point of gaze of the user 125 or measuring the motion of the eyes relative to the head of the user 125. Some embodiments of the eye tracker 135 implement a non-contact, optical method for measuring eye motion. For example, the eye tracker 135 can generate infrared light that illuminates at least a portion of the face of the user 125 that includes the user's eyes. The infrared light is reflected from the user's eyes and analyzed (either by the eye tracker 135 or by the processor 110) to extract information indicating movement or rotation of the eyes based on changes in the characteristics of the reflected infrared light. However, other types of eye trackers can also be used to track movements and positions of the eyes of the user 125. For example, eye motion can be detected using eye attachments such as specially designed contact lenses, electrodes that are placed proximate the eyes, and the like. Although the computer system includes both the camera 130 and the eye tracker 135, this is not required in all embodiments of the computer system. Some embodiments of the computer system include either the camera 130 or the eye tracker 135.

The camera 130 captures images of the user's face corresponding to different gaze directions of the user's eyes in the images. For example, the processor 110 can record images of the user 125 taken by the camera 130 while the user 125 is watching a target image displayed on the screen 120. The target image moves to different locations on the screen 120 and the user 125 is expected to follow the target image with their eyes. The camera 130 captures an image of the user 125 while the user 125 is looking at each of the different locations on the screen 120 indicated by the target image. Thus, the camera 130 produces a set of images that record the user's face while the user is looking in a corresponding set of gaze directions. The user 125 is also instructed to blink and the camera 130 captures one or more images of the user 125 while the user 125 is blinking.

The processor 110 determines three-dimensional (3-D) locations of the eyes of the user 125 in each of the collected images by applying a face detection algorithm to detect a position of the user's face in the image. A landmarker algorithm can then be used to localize the positions of the user's eyes in a two-dimensional (2-D) RGB image defined by the frame of the camera 130. The 2-D locations of the user's eyes in the image are converted to a corresponding location in the depth (D) channel of the camera 130 using a predetermined calibration between depth and RGB values for the pixels in the image. The 2-D locations of the eyes in the depth channel can therefore be used to compute the corresponding 3-D locations of the eyes using the known intrinsic calibration parameters of the camera 130. In embodiments of the computer system that incorporate the eye tracker 135, tracking information acquired by the eye tracker 135 concurrently with the camera 130 capturing images is used refine or improve estimates of the 3-D locations of the eyes in the images.

Locations of the target image on the screen 120 are defined by 2-D coordinates in the plane of the screen 120. Calibration information is used to determine positions and orientations of the screen 120 and the camera 130 in a coordinate system 140 of the camera 130. In some embodiments, the calibration information is determined using a pre-process that is performed prior to capturing images used to generate the eye gaze database 105. The calibration is represented as a transform that converts the 2-D coordinates in the plane of the screen 120 into 3-D locations in the coordinate system 140 defined by the camera 130.

The 3-D locations of the user's eyes and the 3-D locations of the target image that are determined for each image captured by the camera 130 are used to determine gaze vectors that indicate the eye gaze direction for the user 125 in each of the images. For example, a first eye gaze direction 145 for the first image is defined by the relative positions of the 3-D location of the user's eyes in a first image and the 3-D location of the target image while the first image was acquired. For another example, a second eye gaze direction 150 for the second image is defined by the relative positions of the 3-D location of the user's eyes in a second image and the 3-D location of the target image while the second image was acquired. The first eye gaze direction 145 is represented as a first angle 155 relative to a central axis 160 and the second eye gaze direction 150 is represented as a second angle 165 relative to the central axis 160. In the side view 100, the eye gaze directions 145, 150 and the angles 155, 165 are illustrated in a vertical plane. In some embodiments, pan/tilt angles are used to represent the eye gaze directions 145, 150 in the coordinate system 140 of the camera 130.

Figure 2:
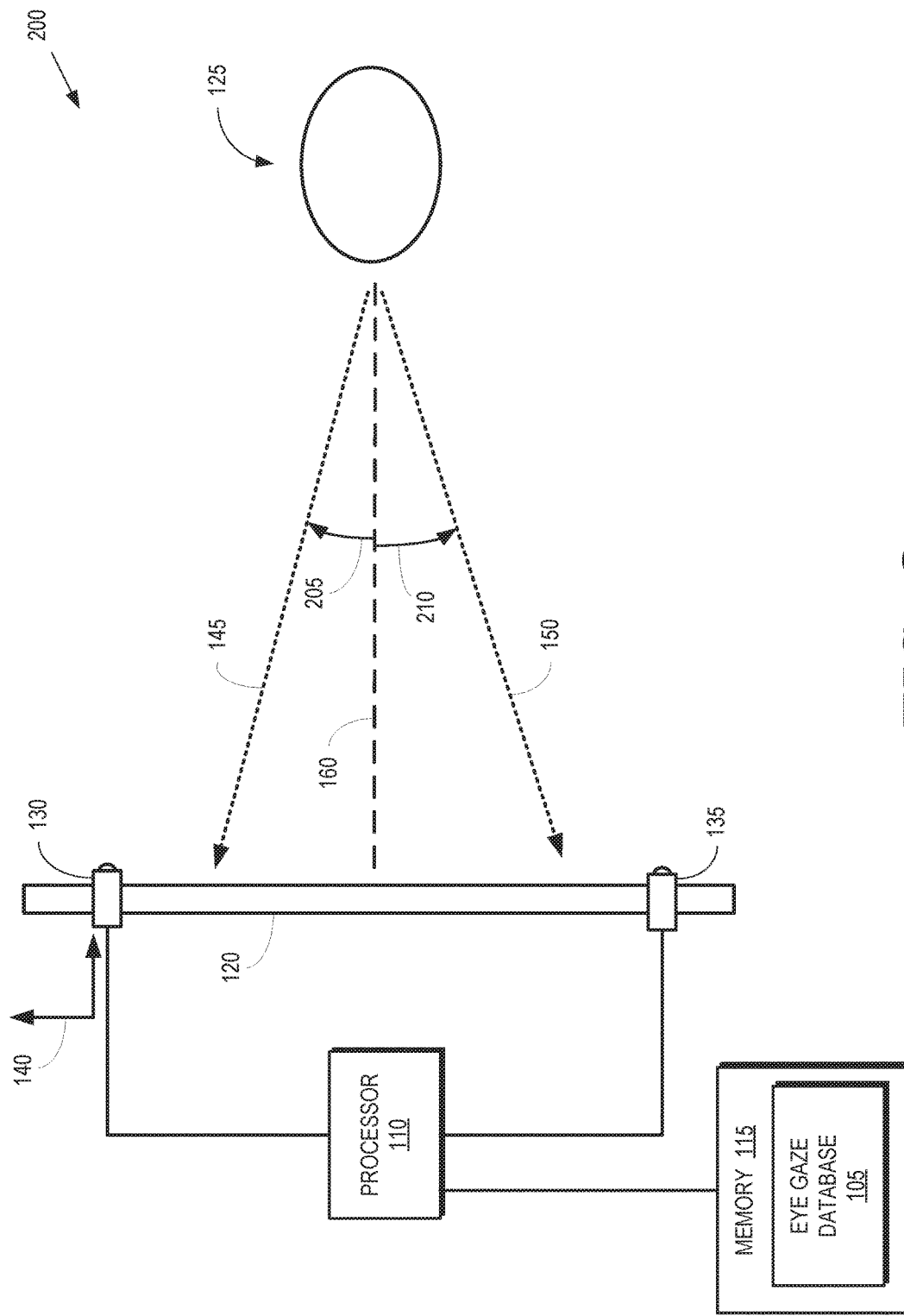
FIG. 2 is a block diagram illustrating a top-down view of a computer system that is used to capture the eye gaze database according to some embodiments.

FIG. 2 is a block diagram illustrating a top-down view 200 of a computer system that is used to capture the eye gaze database 105 according to some embodiments. The computer system includes a processor 110, a memory 115, a screen 120, a camera 130, and (optionally) an eye tracker 135. As discussed herein with regard to FIG. 1, the processor 110 is configured to determine gaze vectors that indicate the eye gaze direction for the user 125 in each of the images acquired by the camera 130 using the 3-D locations of the user's eyes and the 3-D locations of the target image that are determined for each image captured by the camera 130. For example, the first eye gaze direction 145 for the first image is defined by the relative positions of the 3-D location of the user's eyes in a first image and the 3-D location of the target image while the first image was acquired. For another example, the second eye gaze direction 150 for the second image is defined by the relative positions of the 3-D location of the user's eyes in a second image and the 3-D location of the target image while the second image was acquired. In the top-down view 200, the first eye gaze direction 145 is represented as a third angle 205 relative to the central axis 160 and the second eye gaze direction 150 is represented as a fourth angle 210 relative to the central axis 160. In the top-down view 200, the eye gaze directions 145, 150 and the angles 205, 210 are illustrated in a horizontal plane that is perpendicular to the vertical plane in the side view 100 shown in FIG. 1.

Figure 3:
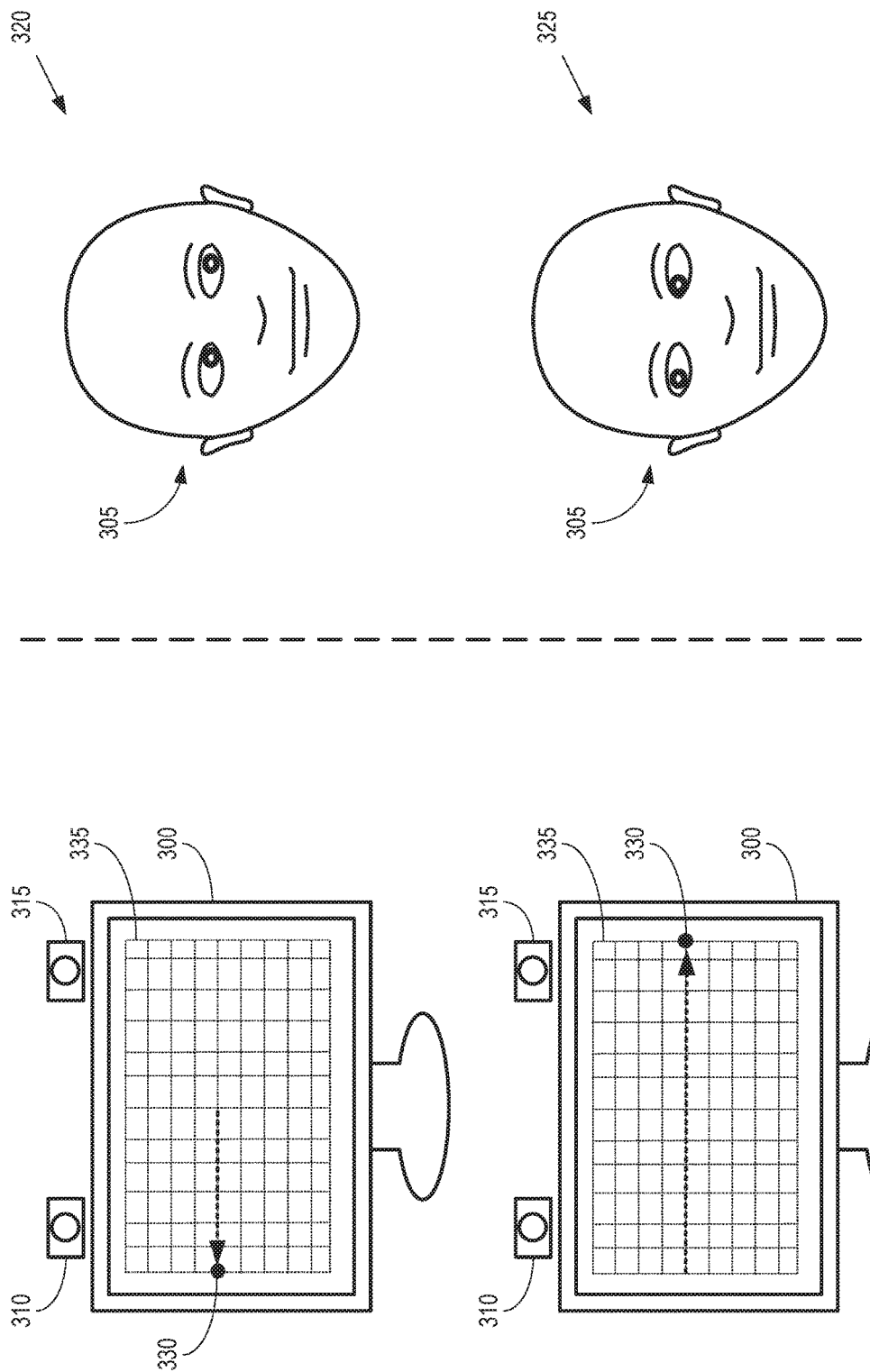
FIG. 3 illustrates a screen and a user during a process of capturing images of the user for generating an eye gaze database according to some embodiments.

FIG. 3 illustrates a screen 300 and a user 305 during a process of capturing images of the user 305 for generating an eye gaze database according to some embodiments. A camera 310 and (optionally) an eye tracker 315 are used to capture images of the user 305 for generating an eye gaze database, as discussed herein. The screen 300 is used to implement some embodiments of the screen 120 shown in FIGS. 1 and 2, the camera 310 is used to implement some embodiments of the camera 130 shown in FIGS. 1 and 2, the eye tracker 315 is used to implement some embodiments of the eye tracker 135 shown in FIGS. 1 and 2, and the user 305 corresponds to the user 125 shown in FIGS. 1 and 2. The screen 300 and the user 305 are illustrated at two time intervals that correspond to two instances 320, 325 at which the camera 310 and (optionally) the eye tracker 315 capture images of the face of the user 305.

A transform between the location of the screen 300 and the location of the camera 310 is determined using a calibration process. For example, a distance between a center of the camera 310 and a center of the screen 300 can be manually measured on maintaining the camera 310 and the screen 300 in fixed relative positions, e.g., parallel to each other. An offset between the screen 300 and the camera 310 can be minimized by keeping the screen 300 close to the camera 310 so that a face image with a frontal (0, 0) gaze angle also has a frontal face pose. Although manual calibration is approximate, the accuracy of the manual calibration is typically sufficient for use cases that do not require extreme precision. For another example, a mirror-based automatic calibration method can be employed. In that case, a known pattern is displayed on the screen 300 and reflected back onto the camera 310 via a mirror (not shown in FIG. 3) that is positioned at different orientations. The reflected image can be compared (e.g., spatially correlated) with the known pattern displayed on the screen 300 to determine the transform between the screen 300 and the camera 310. A transform between the location of the screen 300 and the location of the eye tracker 315 can be determined using the same techniques in embodiments that include the eye tracker 315.

Prior to capturing an image of the user 305 during the first instance 320, a target image 330 is moved to a location on the screen 300. The location of the target image 330 is determined by a grid 335 of locations. An image of the user 305 is captured by the camera 310 and (optionally) the eye tracker 315 during the instance 320 while the user 305 is looking at the target image 330. In the illustrated embodiment, the eyes of the user 305 appear to look to the right and the location of the target image 330 is on the left side of the screen 300 because the user 305 is facing the screen 300. The image captured by the camera 310 and (optionally) the eye tracker 315 is used to determine a corresponding eye gaze direction during the first instance 320 using a 3-D location of the target image 330 and 3-D locations of the user's eyes, as discussed herein.

Prior to capturing an image of the user 305 during the second instance 325, the target image 330 is moved to a different point in the grid 335 that is associated with a different location on the screen 300. The location of the target image 330 on the grid 335 can be modified in response to input from the user 305 or the target image 330 can be automatically advanced to the new position on the grid 335 while the user 305 follows the target image 330 with their eyes. An image of the user 305 is captured by the camera 310 and (optionally) the eye tracker 315 during the instance 325 while the user 305 is looking at the target image 330 in the different location. In the illustrated embodiment, the eyes of the user 305 appear to look to the left and the location of the target image 330 is on the right side of the screen 300 because the user 305 is facing the screen 300. The image captured by the camera 310 and (optionally) the eye tracker 315 is used to determine a corresponding eye gaze direction during the second instance 325 using a 3-D location of the target image 330 and 3-D locations of the user's eyes, as discussed herein.

A complete eye gaze capture process includes moving the target image 330 to each of the locations on the grid 335 and capturing images of the user 305 at each corresponding instance. The eye gaze capture process also includes capturing an image of the user 305 while the user 325 has their eyes closed. This image is referred to as a "blink" image. The set of images captured by the camera 310 and (optionally) the eye tracker 315 are used to generate models of the face of the user 305 that correspond to the eye gaze directions associated with each of the images. The models are referred to herein as "samples" of the user's face.

Figure 4:
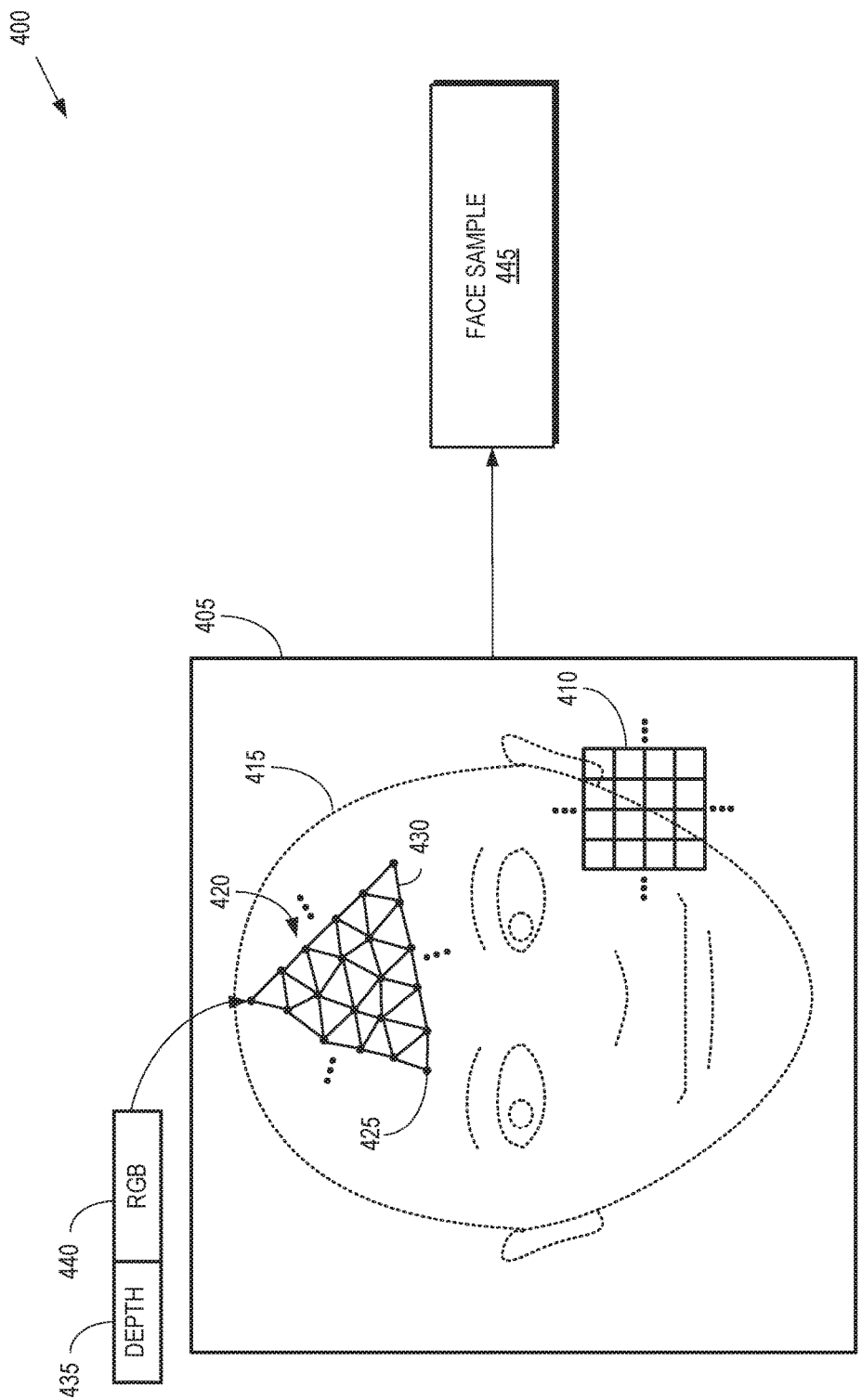
FIG. 4 illustrates a process for generating a model of a user's face from a captured image according to some embodiments.

FIG. 4 illustrates a process 400 for generating a model of a user's face from a captured image 405 according to some embodiments. The captured image 405 is acquired by some embodiments of the camera 130 shown in FIG. 1 or the camera 310 shown in FIG. 3. In the illustrated embodiment, the captured image 405 is one frame in a sequence of frames that are captured to be used in constructing the eye gaze database. The captured image 405 is represented by values of a set 410 of pixels. In the interest of clarity, the scale of the pixels is exaggerated and only a subset of the set 410 of pixels is shown in FIG. 4. The values of the pixels in the set 410 can be represented as RGB values and a corresponding depth value that indicates a distance from the camera that captured the image 405 to a portion of the scene that includes the user's face that is represented by the corresponding pixel. The captured image 405 is converted to a textured face model by a processor such as the processor 110 shown in FIG. 1.

The processor initially runs a face detector algorithm to identify a portion of the captured image 405 that represents the user's face, which is referred to herein as "the detected face 415." For example, the face detector algorithm can return information identifying a boundary of the detected face 415 in the captured image 405. The processor then uses the detected face 415 to compute additional information representative of the user's face, such as a bounding box and landmarks including the eyes, the nose, the mouth, and the like. If the face detector algorithm does not detect a face in the captured image 405, the image is discarded.

Depth data for the pixels that represent the detected face 415 is filtered spatially and temporally. For example, spatial filtering can be performed using a Gaussian, Laplace, or median filter that removes noise or outliers. Temporal filtering is performed by aligning a bounding box of the detected face 415 with bounding boxes of the detected face in other, nearby frames in the video sequence. Alignment of the bounding boxes can be performed using optical flow or facial landmark alignment, followed by temporal averaging of the aligned depth frames, including the aligned frame including the detected face 415.

Filtered data representative of the detected face 415 is triangulated to create a 3-D model 420 of the user's face. The 3-D model 420 includes a set of vertices 425 (only one indicated by a reference numeral in the interest of clarity) that are interconnected by corresponding edges 430 (only one indicated by a reference numeral in the interest of clarity). The vertices 425 are associated with corresponding pixels in the detected face 415. Triangulation is performed by connecting the vertices 425 associated with adjacent pixels in the depth frame by edges 430, while ignoring pixels that have an unknown depth or a depth that is sufficiently different from depth of neighboring pixels to indicate a depth discontinuity. An RGB texture for the 3-D model 420 is defined by mapping the vertices 425 to their pixel locations in the RGB image 405. For example, the RGB texture can be defined by a depth value 435 and an RGB value 440 for each of the vertices 425. In some embodiments, the depth value 435 can be determined or improved using Structure from Motion (SfM) techniques or machine-learning-based depth prediction techniques. The texture mapped 3-D face model 420 is stored as a face sample 445. Face samples for images in different frames can be aligned and filtered to improve the quality of the models.

Figure 5:
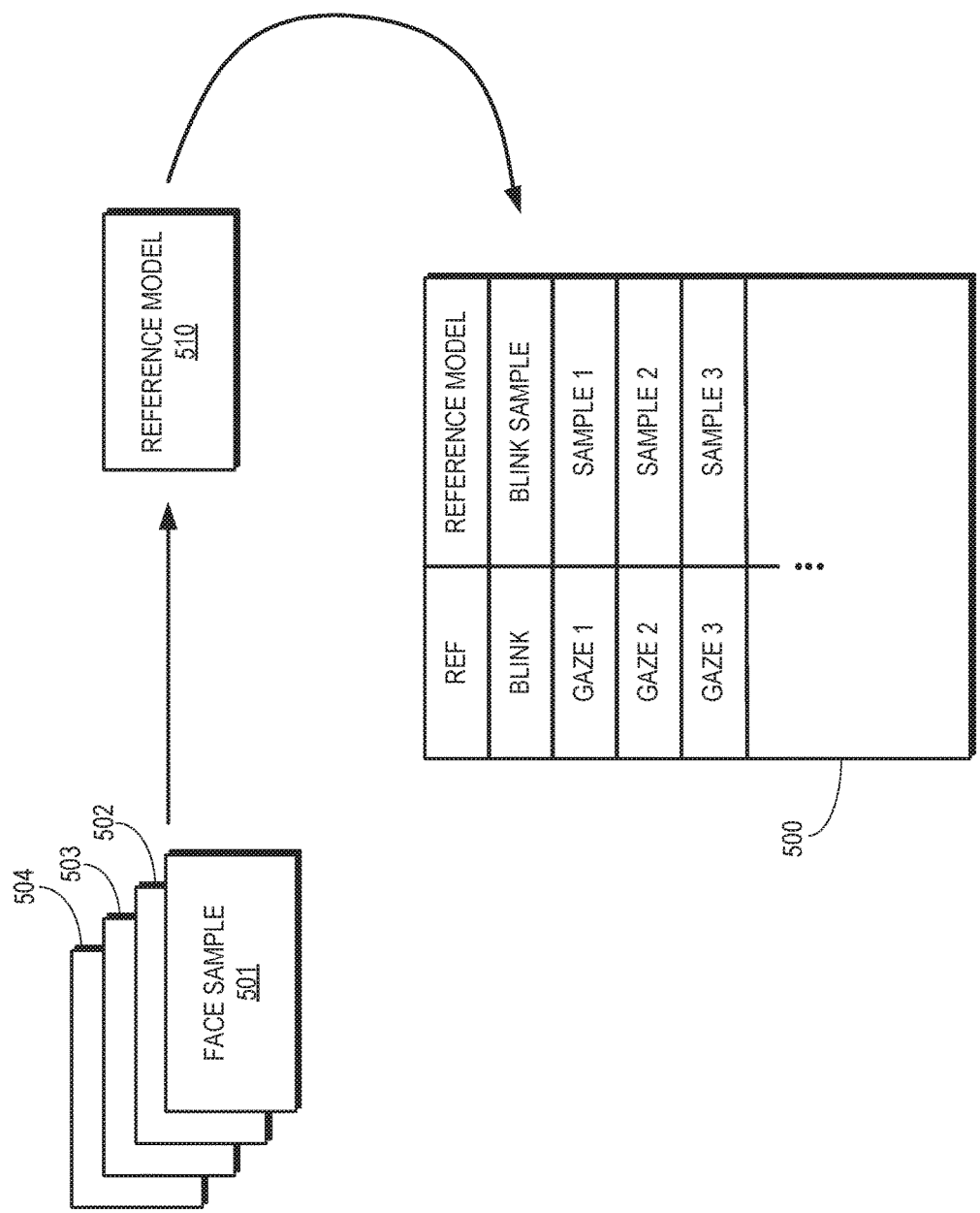
FIG. 5 is a block diagram including an eye gaze database that is produced using aligned and filtered face samples according to some embodiments.

FIG. 5 is a block diagram including an eye gaze database 500 that is produced using aligned and filtered face samples 501, 502, 503, 504 according to some embodiments. The face samples 501-504 are generated by a processor that is configured to create texture mapped 3-D face models that are used to form the face samples 501-504 as discussed with regard to FIG. 4. In the illustrated embodiment, the face samples 501-504 are temporal neighbors, e.g., they are generated from images captured by a camera in successive time intervals as a user moves their eyes to follow a pattern on a screen. The face samples 501-504 are also a subset of a larger set of face samples acquired for the user.

In some embodiments, the subset of face samples 501-504 can be aligned with each other or the face samples 501-504 can be aligned with the larger set of face samples. For example, the face samples 501-504 can be aligned using an iterative closest point (ICP) algorithm to perform 3-D alignment of the face samples 501-504. In some cases, the ICP algorithm is combined with RGB alignment using feature tracking, facial landmark tracking, and the like. Once the face samples 501-504 have been aligned, the face samples 501-504 can be filtered to average corresponding points in the face samples 501-504, while excluding points that do not match because of errors, non-rigid deformations on the face, and the like.

The aligned and filtered face samples 501-504 can be combined to form a reference model 510 that defines the geometry of the model of the face. In the illustrated embodiment, the user's face is (or is assumed to be) stationary while the camera captures the images that are used to produce the face samples 501-504. The face samples 501-504 (and any other available face samples) are therefore used to produce a single reference model 510. However, in some cases, the geometry of the user's face changes because the user is not able to stay still or remain expressionless during the image capture process. Changes in the position of the user's face or the expression on the user's face breaks the rigidity assumption that is used to produce the single reference model 510 from the face samples 501-504. This can lead to unpleasant jerky behavior during rendering of images based on the reference model 510 and the face samples 501-504. Some embodiments are therefore able to generate multiple reference models corresponding to different base positions or expressions. Changes in the shape of the face can also be recorded in the form of geometry textures, e.g., displacement or normal maps. Shaders implemented in graphics processing units (GPUs) can utilize the geometry textures while rendering images based on the reference model 510 and the face samples 501-504.

The eye gaze database 500 is used to store the reference model 510 and the face samples 501-504 for the user. The reference model 510 is indexed by a predetermined value (REF). The face samples 501-504 are indexed by the eye gaze direction that is determined from the image that is used to produce the corresponding face sample. For example, sample 1 is indexed by gaze 1, sample 2 is indexed by gaze 2, and sample 3 is indexed by gaze 3. The eye gaze database 500 also includes a blink sample that represents a texture mapped 3-D model of the user's face with eyes closed. The blink sample is indexed by a predetermined value (BLINK). The reference model 510, the blink sample, or the face samples 501-504 can be accessed from the eye gaze database 500 using the corresponding index. In embodiments that include multiple reference models and corresponding face samples that are associated with different expressions or emotions, the eye gaze database 500 can also be indexed by parameters that define the expressions or emotions.

As discussed herein, the reference model 510 and the face samples 501-504 are used to render images of some or all of the user's face. For example, the reference model 510 and the face samples 501-504 can be used to render images for headset removal and mixed reality applications. Since the reference model 510 only represents the geometry of the face, the reference model 510 is combined with the 3-D texture model represented by one of the face samples 501-504 to produce an image that represents the user's face. Each face sample 501-504 corresponds to a different eye gaze direction. The user can therefore appear to be looking in different directions depending on which of the face samples 501-504 is used to produce the textures that are applied to the reference model 510.

Figure 6:
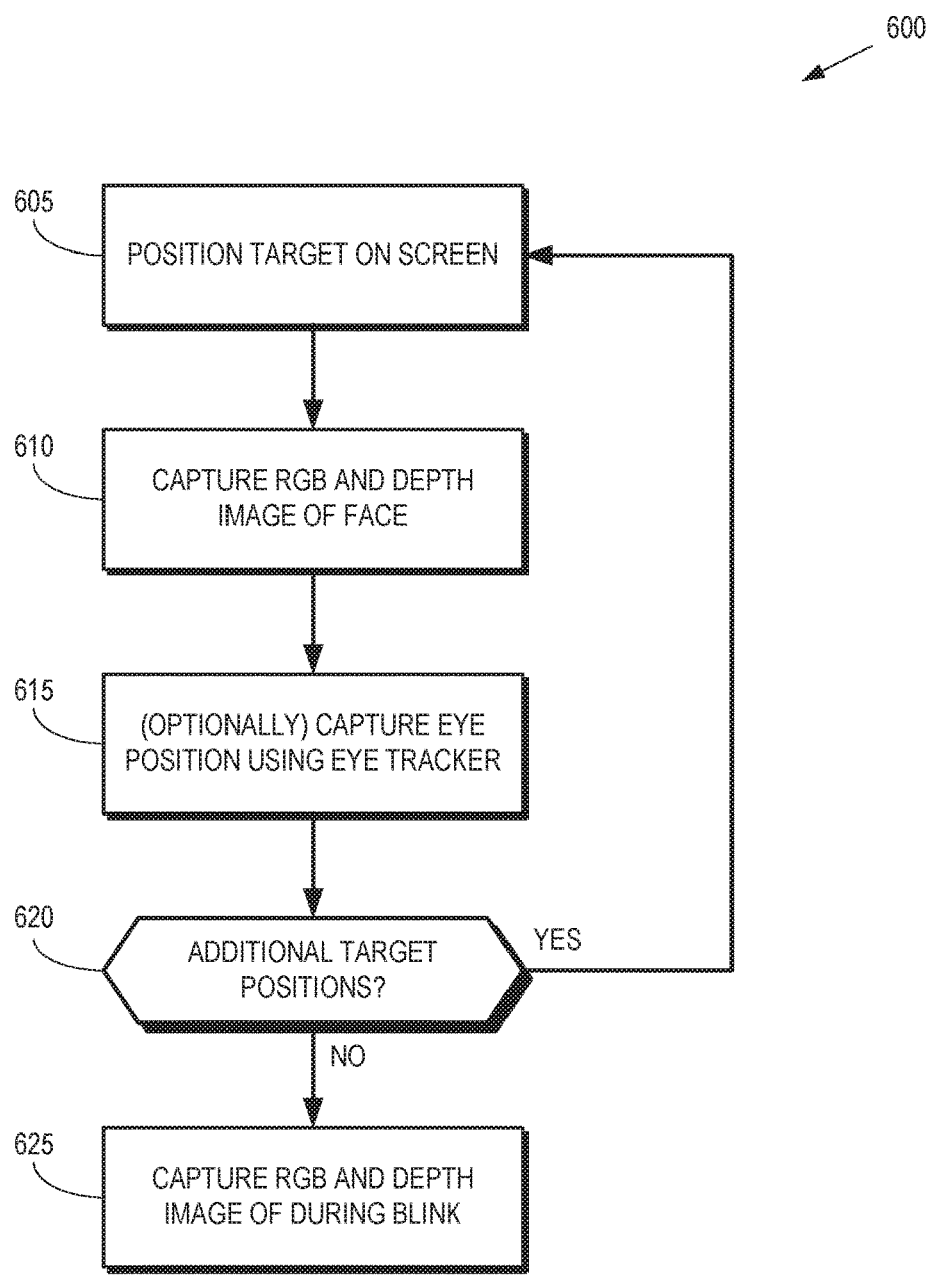
FIG. 6 is a flow diagram of a method for capturing images of the user's face that are used to generate an eye gaze database according to some embodiments.

FIG. 6 is a flow diagram of a method 600 for capturing images of the user's face that are used to generate an eye gaze database according to some embodiments. The method 600 is implemented in some embodiments of the processing system shown in FIGS. 1 and 2.

At block 605, a processor provides signals that position a target image on a screen. The user is instructed to remain still and expressionless while following the target image with their eyes. The user is also instructed to train their eyes on the target image displayed on the screen and to follow the target image as it moves across the screen.

At block 610, a camera captures an image of the user's face while the user is watching the target image. The image includes RGB values of pixels that represent the image (which includes the user's face) and depth values for the pixels. Each depth value indicates a distance from the camera to a portion of the scene that is represented by the corresponding pixel. In embodiments that include an eye tracker, information indicating the position and orientation of the user's eyes are captured by the eye tracker at block 615. For example, the position and orientation of the user's eyes can be captured by the eye tracker 135 shown in FIG. 1.

At decision block 620, the processor determines whether there are additional target positions. For example, the target positions can be determined by a grid of target positions and the processor can determine whether the target image has been positioned at all of the target positions indicated by the grid. If there are additional target positions that have not been used, the method 600 flows to block 605. If there are no additional target positions, the method 600 flows to block 625 and the user is instructed to close their eyes. The camera captures an additional blink image while the user has their eyes closed.

Figure 7:
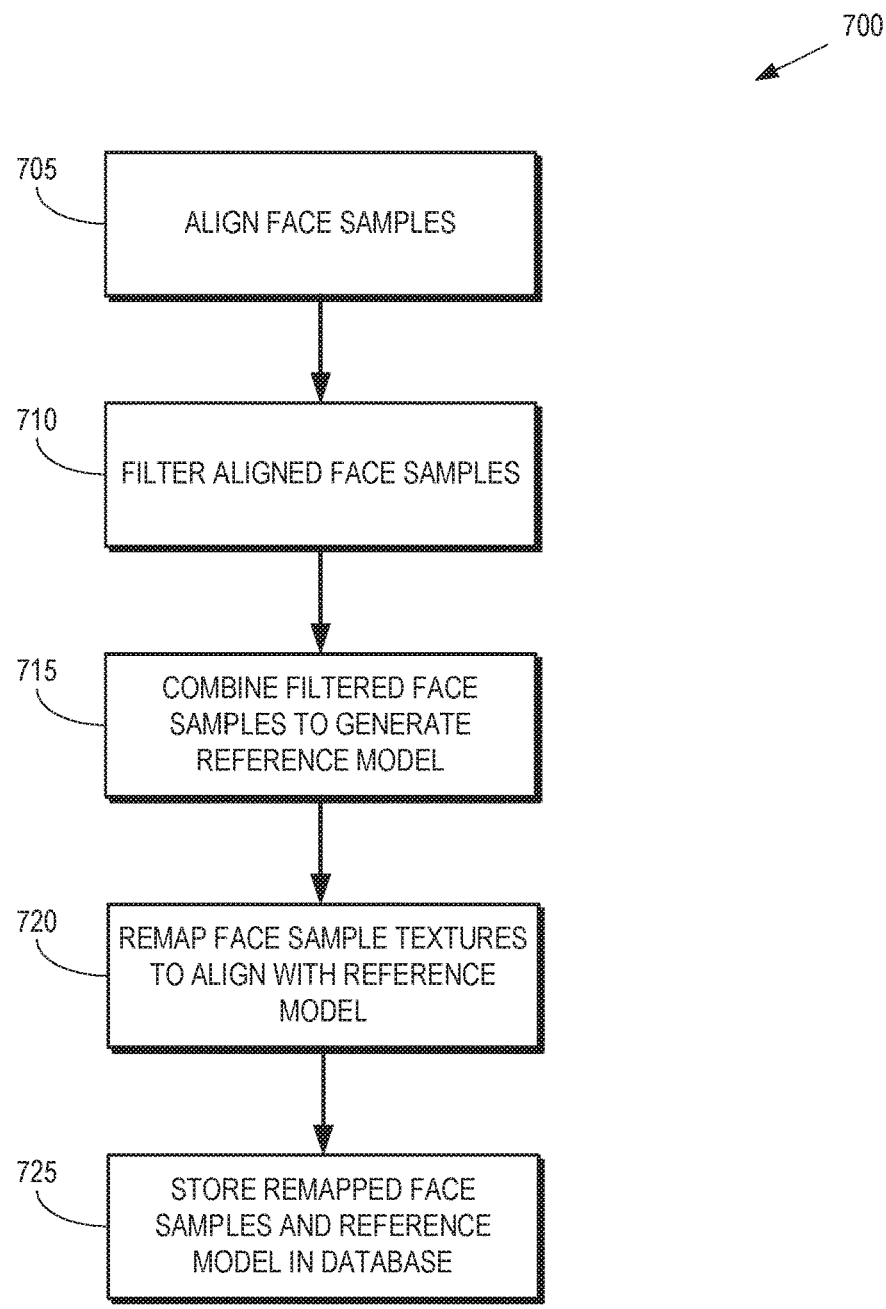
FIG. 7 is a flow diagram of a method for generating an eye gaze database using face samples acquired from images of a user's face while looking in different directions according to some embodiments.

FIG. 7 is a flow diagram of a method 700 for generating an eye gaze database using face samples acquired from images of a user's face while looking in different directions according to some embodiments. The method 700 is implemented in some embodiments of the processor 110 shown in FIGS. 1 and 2.

At block 705, a set of face samples are aligned based on information included in the 3-D models of the user's face that are represented by the face samples. The face samples can be aligned using ICP algorithms, RGB alignment using feature tracking, facial landmark tracking, or combinations thereof.

At block 710, the aligned face samples are temporally and spatially filtered. Spatial filtering can be performed by applying a Gaussian or median filter to remove noise or outliers from the aligned face samples. Temporal filtering can be performed by aligning bounding boxes of the face samples using optical flow or facial landmark alignment, followed by temporal averaging.

At block 715, the filtered and aligned face samples are combined to generate a reference model. As discussed herein, the reference model represents the geometry of a 3-D model of the face in the filtered and aligned face samples.

At block 720, the textures in the filtered and aligned face samples are remapped to align with the reference model. For example, the texture mapped 3-D models in the filtered and aligned face samples can be re-rendered from the viewpoint of the reference model. In some embodiments, texture alignment across the face samples is further improved by performing a 2-D image registration to remove remaining misalignments between the face samples.

At block 725, the remapped, filtered, and aligned face samples are stored in the eye gaze database and indexed by the corresponding eye gaze direction. The reference model and a blink model (which may also be remapped, filtered, and aligned as discussed herein) are also stored in the eye gaze database.

Figure 8:
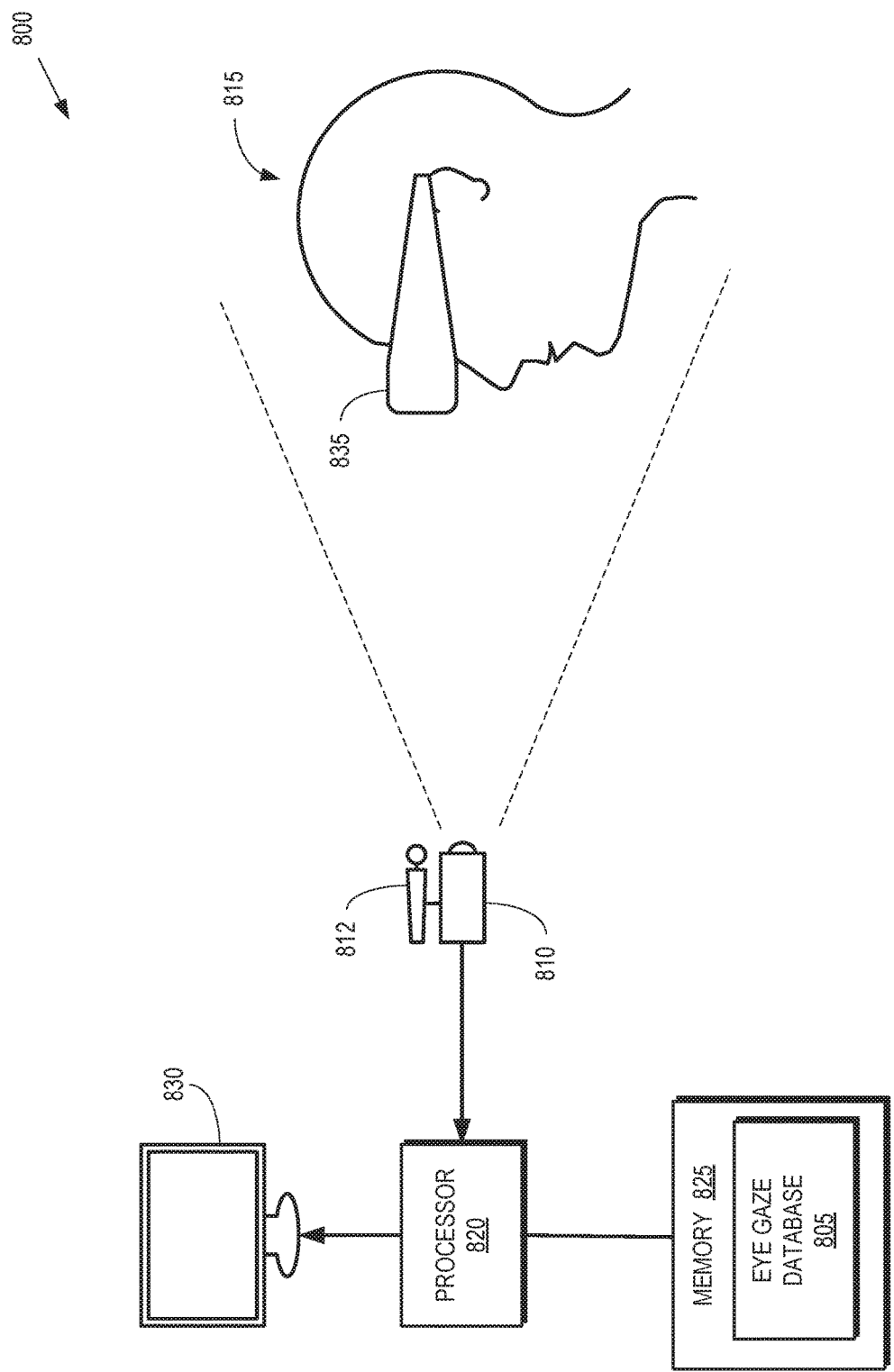
FIG. 8 is a diagram illustrating a processing system that is configured to perform headset removal using information stored in an eye gaze database according to some embodiments.

FIG. 8 is a diagram illustrating a processing system 800 that is configured to perform headset removal using information stored in an eye gaze database 805 according to some embodiments. The processing system 800 includes a camera 810 that is used to capture images of a scene including a user that is represented by the user's head 815. The camera 810 can be implemented as an RGB camera that generates an image represented by RGB values of pixels in the image, an RGBD camera that generates an image represented by the RGB values of the pixels in the image and depth values that represent a distance between the camera 810 and a portion of the scene that is represented by the corresponding pixels, or other types of cameras. Some embodiments of the camera 810 are video cameras that capture a configurable number of images per second. Images captured by a video camera are typically referred to as "frames" and the rate of image capture is measured in frames per second (FPS). For example, the camera 810 can capture images at 60 FPS, 90 FPS, 120 FPS, or at other higher or lower rates. Some embodiments of the camera 810 are attached to a tracker 812, such as a VR tracker, that is used to determine a position and orientation of the camera 810.

The processing system 800 also includes a processor 820 and a memory 825. The processor 820 is configured to execute instructions, such as instructions stored in the memory 825 and store the results of the instructions in the memory 825. The processor 820 is also configured to receive information representative of the images captured by the camera 810, such as RGB values, depth values, and the like for each of the pixels in the images. The processor 820 can store the received information in the memory 825. The processor 820 is also configured to render images based on the information received from the camera 810 or information accessed from the memory 825. The images are rendered on a display 830. Although the display 830 is depicted as a television screen or a monitor in the interest of clarity, some embodiments of the display are implemented in other devices such as cell phones, tablet computers, head mounted displays (HMDs), and the like. A copy of the eye gaze database 805 is stored in the memory 825 and the processor 820 is able to access information in the eye gaze database from the memory 825.

The eye gaze database 805 is produced using some embodiments of the processing system shown in FIG. 1. For example, the eye gaze database 805 is generated using some embodiments of the method 600 shown in FIG. 6 and the method 700 shown in FIG. 7. Some embodiments of the eye gaze database 805 are generated prior to performing headset removal using a processing system that differs from the processing system 800. For example, a user 815 can perform a capture process to generate the eye gaze database 805 prior to engaging in an AR, VR, or mixed reality (MR) session using the processing system 800. In cases where the eye gaze database 805 is generated using a pre-process, the eye gaze database 805 can be stored in a non-transitory computer readable media, which can include memory elements such as RAM implemented in a cloud server, digital video discs (DVDs), flash memory, and the like. The stored eye gaze database 805 can subsequently be transferred or copied to a memory 825 in the processing system 800. For example, the eye gaze database 805 can be downloaded from the cloud server via wired or wireless communication links, a DVD storing the eye gaze database 805 can be accessed using a disk drive implemented in the processing system 800, a flash drive that stores the eye gaze database 805 can be inserted into a USB port in the processing system 800, and the like. Alternatively, the processing system 800 can be configured to generate the eye gaze database 805, e.g., using some embodiments of the method 600 shown in FIG. 6 and the method 700 shown in FIG. 7. In cases where the eye gaze database 805 is generated by the processing system 800, the eye gaze database 805 can be stored directly in the memory 825.

The user 815 is wearing an HMD 835 that allows the user to participate in VR, AR, or MR sessions supported by corresponding applications, which may be implemented in the processor 820 or in other processors such as remote cloud servers. The VR, AR, or MR session produces a virtual 3-D scene that includes the user 815 and can be displayed on the display 830. The camera 810 captures images of the user 815 while the user 815 is participating in the VR, AR, or MR session. The captured images (or at least a portion thereof) are then merged into the virtual 3-D scene and shown on the display 830. The user 815 in the virtual 3-D scene can be viewed by other users and, in some cases, the other users in the virtual 3-D scene can be viewed by the user 815. For example, if the user 815 is participating in a shared VR, AR, or MR session that allows other users (not shown in FIG. 8) to see each other and the user 815, the captured images of the user 815 can be merged into the virtual 3-D scene and displayed in HMDs worn by the other users that are participating in the shared VR, AR, or MR sessions. However, portions of the face of the user 815, and in particular the eyes of the user 815, are occluded by the HMD 835 so that the images of the user 815 that are shown in the display 830 (or other displays) have a disconcerting "brick-in-the-face" appearance. Consequently, the HMD 835 worn by the user 815, as well as other HMDs worn by other users, prevent the users from making eye contact during virtual interactions, which can disrupt the sense of immersion and social connection between the users in a virtual 3-D scene.

At least in part to improve the sense of immersion and social connection between the user 815 and other users that view an image of the user 815 in the virtual 3-D scene, the processor 820 renders a portion of a model of the face of the user 815 that corresponds to the portion of the face that is occluded by the HMD 835 and overwrites a portion of the image corresponding to the HMD 835 with the rendered portion of the model of the face of the user 815. In some embodiments, the camera 810 captures an image of the user 815 while the user 815 is wearing the HMD 835, which occludes a portion of the face of the user 815. The processor 820 determines a three-dimensional (3-D) pose that indicates an orientation and a location of the face of the user's head 815 relative to the camera 810. As used herein, the term "pose" refers to parameters that characterize the translation and rotation of a person or object in a scene. A pose is determined relative to a coordinate system. Thus, the 3-D pose of the user's head 815 relative to the camera 810 is determined in a coordinate system associated with the camera 810. For example, the 3-D pose of the user's head 815 relative to the camera 810 include the X, Y, and Z coordinates that define the translation of the user's head 815 and the pitch, roll, and yaw values that define the rotation of the user's head 815 relative to the camera 810.

The processor 820 renders a 3-D model of the occluded portion of the user's face and uses the rendered image to overwrite or replace a portion of the HMD 835 in the virtual 3-D scene based on the 3-D pose. The processor 820 renders the 3-D model of the occluded portion of the user's face using texture samples accessed from the eye gaze database 805. For example, an eye gaze direction of the user 815 can be detected and used as an index into the eye gaze database 805. Texture samples are accessed from the eye gaze database 805 based on the index. For example, the processor 820 can access textures from the face samples associated with the index from an eye gaze database 805 such as the eye gaze database 500 shown in FIG. 5. In some embodiments, the texture samples are color corrected using an affine transformation that maps colors of the texture samples to colors of an unoccluded portion of the user's face in the image. Replacing portions of the HMD 835 with portions of the rendered 3-D model of the face of the user 815 in the virtual 3-D scene provides the illusion that the HMD 835 has been removed or is transparent. In some embodiments, the HMD 835 is rendered as a translucent object. For example, the 3-D model of the occluded portion of the user's face can be rendered using a translucence that varies from a center to an edge of the occluded portion of the user's face.

Figure 9:
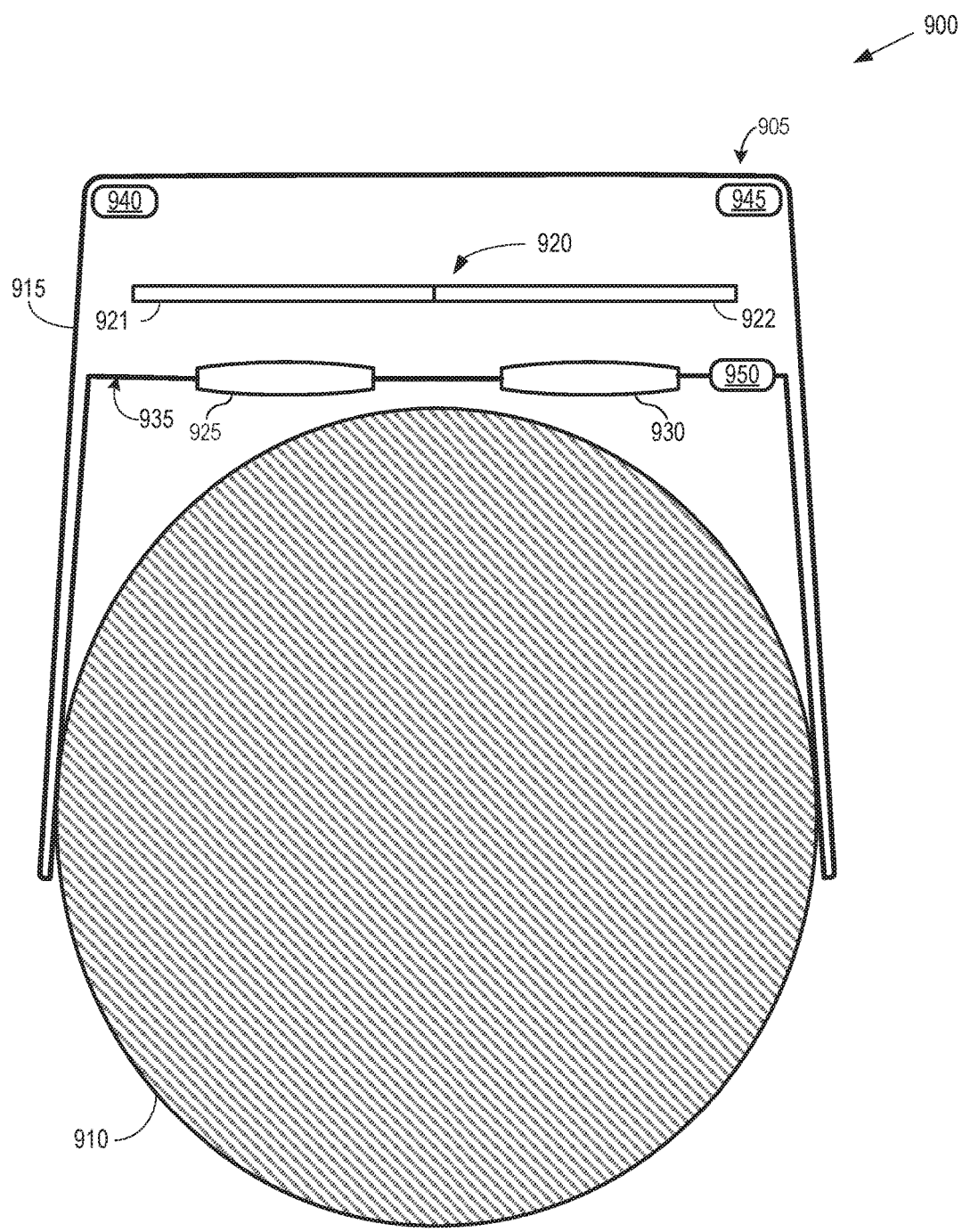
FIG. 9 illustrates a display system that includes an electronic device configured to provide VR, AR, or MR functionality via a display according to some embodiments.

FIG. 9 illustrates a display system 900 that includes an electronic device 905 configured to provide VR, AR, or MR functionality via a display according to some embodiments. The illustrated embodiment of the electronic device 905 can include a portable user device, such as an HMD, a tablet computer, computing-enabled cellular phone (e.g., a "smartphone"), a notebook computer, a personal digital assistant (PDA), a gaming console system, and the like. In other embodiments, the electronic device 905 can include a fixture device, such as medical imaging equipment, a security imaging sensor system, an industrial robot control system, a drone control system, and the like. For ease of illustration, the electronic device 905 is generally described herein in the example context of an HMD system; however, the electronic device 905 is not limited to these example implementations.

The electronic device 905 is shown in FIG. 9 as being mounted on a head 910 of a user. The electronic device 905 is therefore used to implement some embodiments of the HMD 835 shown in FIG. 8. As illustrated, the electronic device 905 includes a housing 915 that includes a display 920 that generates an image for presentation to the user. The display 920 is used to implement some embodiments of the display 830 shown in FIG. 8. In the illustrated embodiment, the display 920 is formed of a left display 921 and a right display 922 that are used to display stereoscopic images to corresponding left eye and right eye. However, in other embodiments, the display 920 is a single monolithic display 920 that generates separate stereoscopic images for display to the left and right eyes. The electronic device 905 also includes eyepiece lenses 925 and 930 disposed in corresponding apertures or other openings in a user-facing surface 935 of the housing 915. The display 920 is disposed distal to the eyepiece lenses 925 and 930 within the housing 915. The eyepiece lens 925 is aligned with the left eye display 921 and the eyepiece lens 930 is aligned with the right eye display 922.

In a stereoscopic display mode, imagery is displayed by the left eye display 921 and viewed by the user's left eye via the eyepiece lens 925. Imagery is concurrently displayed by the right eye display 922 and viewed by the user's right eye via the eyepiece lens 925. The imagery viewed by the left and right eyes is configured to create a stereoscopic view for the user. Some embodiments of the displays 920, 921, 922 are fabricated to include a bezel (not shown in FIG. 9) that encompasses one or more outer edges of the displays 920, 921, 922. In that case, the lenses 925, 930 or other optical devices are used to combine the images produced by the displays 920, 921, 922 so that bezels around the displays 920, 921, 922 are not seen by the user. Instead, lenses 925, 930 merge the images to appear continuous across boundaries between the displays 920, 921, 922.

Some or all of the electronic components that control and support the operation of the display 920 and other components of the electronic device 905 are implemented within the housing 915. Some embodiments of the electronic device 905 include one or more sensors 940, 945 that are used to detect a position or orientation of the electronic device 905. Although two sensors 940, 945 are shown in the interest of clarity, the electronic device 905 can include more or fewer sensors. The sensors 940, 945 can include accelerometers, magnetometers, gyroscopic detectors, position sensors, infrared sensors, and the like, which can be implemented as micro-electrical-mechanical (MEMS) sensors. Some embodiments of the electronic device 905 include sensors 940, 945 that are able to generate information indicating the six degree-of-freedom (6DoF) pose of the electronic device 905, which includes a three-dimensional position of the electronic device 905 and a three-dimensional orientation of the electronic device 905. The 6Dof pose is generated in a coordinate system defined by the electronic device 905. Some embodiments of the electronic device 905 include sensors 940, 945 that are only able to generate information indicating fewer degrees of freedom or no pose information at all. For example, the sensors 940, 945 may only be able to provide a three degree-of-freedom (3DoF) pose of the electronic device 905.

Some embodiments of the electronic device 905 implement an eye tracker 950 that is configured to track movements and positions of the eyes of the user 910 by measuring the point of gaze of the user 910 or measuring the motion of the eyes relative to the head of the user 910. As discussed herein, some embodiments of the eye tracker 950 implement a non-contact, optical method for measuring eye motion. However, other types of eye trackers can also be used to track movements and positions of the eyes of the user 910. For example, eye motion can be detected using eye attachments such as specially designed contact lenses, electrodes that are placed proximate the eyes, and the like.

Figure 10:
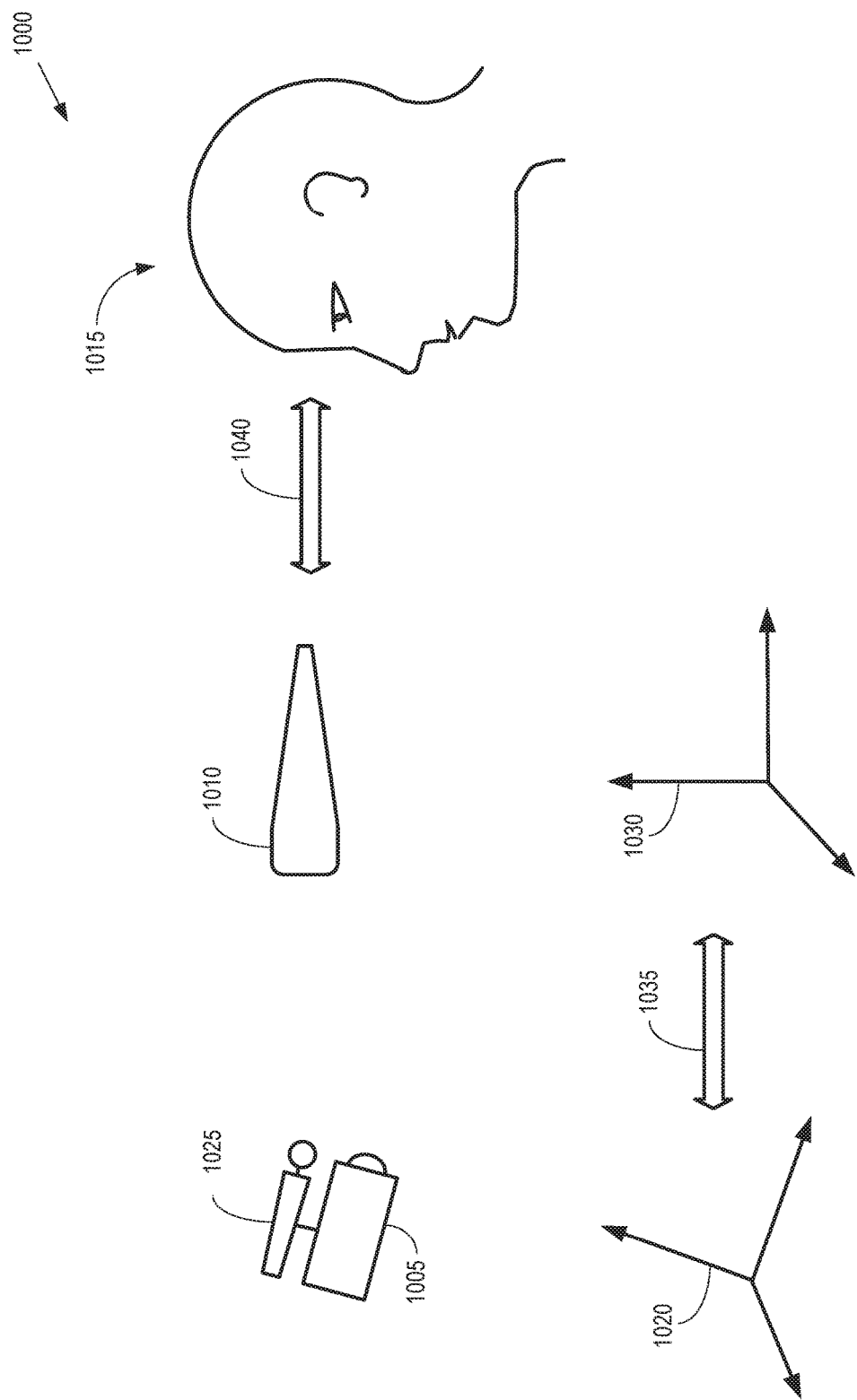
FIG. 10 illustrates relative positions and orientations of a camera, an HMD, and a user in a headset removal system according to some embodiments.

FIG. 10 illustrates relative positions and orientations of a camera 1005, an HMD 1010, and a user 1015 in a headset removal system 1000 according to some embodiments. The camera 1005, the HMD 1010, and the user 1015 correspond to the camera 810, the HMD 835, and the user 815 shown in FIG. 8. The relative positions and orientations shown in FIG. 10 are used to determine a 3-D pose that indicates an orientation and a location of the face of the user 1015 relative to the camera 1005. However, the 3-D pose of the user 1015 is not necessarily known in a coordinate system 1020 associated with the camera 1005. Furthermore, the 3-D pose of the user 1015 in the coordinate system 1020 is likely to change in response to movement of the user 1015. The coordinate system 1020 associated with the camera 1005 is also susceptible to change. For example, the coordinate system 1020 can be defined by a VR tracker 1025 that is attached to the camera 1005 and use to track the position and orientation of the camera 1005. Changes in the position or orientation of the camera 1005, or changes in the relative position and orientation of the VR tracker 1025 and the camera 1005, result in changes to the coordinate system 1020.

A 3-D pose of the user 1015 in the coordinate system 1020 associated with the camera 1005 can be determined using a matching algorithm to match a 3-D model of the face of the user 1015 to pixels in images acquired by the camera 1005. The 3-D pose of the user 1015 that is determined by the matching algorithm is referred to as $P_{FACE,MATCH}$. The matching algorithm can be implemented as 2-D matching if the camera 1005 only provides color values of the pixels or 3-D matching if the camera 1005 also provides depth information. In 2-D matching, matching is performed based on the visual similarity between portions of the image and a rendered 3-D model of the face of the user 1015. Measures of the similarity are referred to as "scores." For example, the 3-D model of the face can be rendered for a set of locations and orientations relative to the camera 1005 to produce a set of 2-D model images. Each of the set of 2-D model images is compared to the image captured by the camera 1005 and the closest match (e.g., the highest score) determines the estimated location and orientation (e.g., the pose $P_{FACE,MATCH}$) of the user 1015. Alternatively, the matching algorithm could minimize misalignment of 2-D features between the image captured by the camera 1005 and the 2-D model images. In the 3-D matching, matching is performed using ICP matching, as discussed herein. The model of the user 1015 can be acquired from an eye gaze database. For example, the model can be a reference model such as the reference model 510 stored in the eye gaze database 500 shown in FIG. 5.

The images acquired by the camera 1005 include images of the user 1015 in which the face of the user 1015 is largely occluded by the HMD 1010. Thus, the matching algorithm used to determine $P_{FACE,MATCH}$ is required to match the largely occluded face with an unoccluded 3-D model of the face. In the 3-D case, a face detector is applied to the 3-D face model and pixels near the eye region of the face are eliminated because these pixels are likely to be occluded and consequently are likely to generate noise in the matching algorithm. Pixels in the images that represent the HMD 1010 are also removed from the live depth stream including the acquired images. In the 2-D case, scores for a hypothetical pose are generated by rendering the 3-D face model from the pose. Pixels that are likely to be occluded are blanked out by rendering a mask that represents the model of the HMD 1010 and laying the mask over the image to indicate the pixels that should be removed from the matching process. Matching is then performed on the remaining pixels in the rendered image of the 3-D face model and the acquired images.

In some embodiments, a transform 1035 between the coordinate system 1020 and the coordinate system 1030, as well as a relative location and orientation of the user 1015 with respect to the HMD 1010 that is indicated by the double-headed arrow 1040, remain constant over an extended time interval that includes numerous frames or images captured by the camera 1005. Consequently, the pose of the HMD 1010 can be used as a proxy for the pose of the user 1015, which is particularly useful for embodiments of the HMD 1010 that provide 6DoF pose information in real time. In that case, the 3-D pose of the user 1015 in the coordinate system 1020 is determined based on the transform 1035 and a transform matrix that represents the relative location and orientation of the user 1015 indicated by the double-headed arrow 1040. For example, the pose ($P_{FACE,CAMERA}$) of the user 1015 in the coordinate system 1020 in a frame (i) can be written as:

$$P_{FACE,CAMERA}(i) = R_{FACE \to HMD}(i) \cdot P_{HMD}(i) \cdot T_{HMD \to CAMERA}(i)$$

where $P_{HMD}(i)$ is the pose of the HMD 1010 in the coordinate system 1030, $R_{FACE \to HMD}(i)$ is a transform matrix that represents the relative location and orientation of the user 1015 with respect to the HMD 1010, and $T_{HMD \to CAMERA}(i)$ is the transform 1035 between the coordinate system 1020 and the coordinate system 1030. As discussed above, neither $T_{HMD \to CAMERA}(i)$ nor $R_{FACE \to HMD}(i)$ is necessarily known a priori and either quantity can change, e.g., when the user 1015 adjusts the HMD 1010 or when the VR tracker 1025 is moved with respect to the camera 1005.

The unknown quantities $R_{FACE \to HMD}(i)$ and $T_{HMD \to CAMERA}(i)$ are computed using matching algorithms that compare pixels in the images to corresponding models. For example, the transform $T_{HMD \to CAMERA}(i)$ can be determined by matching a model of the HMD 1010 to values of pixels in the images captured by the camera 1005. For another example, the transform matrix $R_{FACE \to HMD}(i)$ can be determined by matching a model of unoccluded portions of the face of the user 1015, such as a mouth/jaw region or a forehead region, to values of pixels in the images captured by the camera 1005, as discussed herein.

The matching algorithms can be implemented as 2-D matching if the camera 1005 only provides color values of the pixels or 3-D matching if the camera 1005 also provides depth information. In 2-D matching, matching is performed based on the visual similarity of portions of the image to rendered 3-D models, e.g., a rendered 3-D model of the HMD 1010 or a rendered 3-D model of the face of the user 1015. For example, the 3-D model can be rendered for a set of locations and orientations relative to the camera 1005 to produce a set of 2-D model images. Each of the set of 2-D model images is compared to the image captured by the camera 1005 and the closest match determines the estimated location and orientation of the HMD 1010 or the user 1015. Alternatively, the matching algorithm could minimize misalignment of 2-D features between the image captured by the camera 1005 and the 2-D model images. In the 3-D matching, matching is performed using ICP matching, as discussed herein.

The unknown quantities $R_{FACE \to HMD}(i)$ and $T_{HMD \to CAMERA}(i)$ are determined from the results of the matching algorithms. The pose of the HMD 1010 determined by the matching algorithm is expressed as:

$$P_{HMD,MATCH}(i) = T_{HMD \to CAMERA}(i) \cdot P_{HMD}(i).$$

The transform $T_{HMD \to CAMERA}(i)$ can be determined as:

$$T_{HMD \to CAMERA}(i) = P_{HMD}^{-1} \cdot P_{HMD,MATCH}(i)$$

The transform matrix $R_{FACE \to HMD}(i)$ can be determined as:

$$R_{FACE \to HMD}(i) = P_{HMD,MATCH}^{-1}(i) \cdot P_{FACE,MATCH}$$

where $P_{FACE,MATCH}$ is the pose of the face determined by matching the 3-D model of the face of the user 1015 to the acquired image, as discussed above. The computation of the transform matrix $R_{FACE \to HMD}(i)$ can be improved if the HMD 1010 includes an eye tracker such as the eye tracker 950 shown in FIG. 9. For example, the eye positions determined by the eye tracker can be used as robust 2-D features to improve the computation of the transform matrix $R_{FACE \to HMD}(i)$.

The quantities $R_{FACE \to HMD}(i)$ and $T_{HMD \to CAMERA}(i)$ can be determined for a single (or initial) image (i) and then reused as long as they have not changed. Thus, in embodiments in which the HMD 1010 provides information indicating the 6DoF pose of the HMD 1010 in a coordinate system 1030 associated with the HMD 1010, computation of the quantities $R_{FACE \to HMD}(i)$ and $T_{HMD \to CAMERA}(i)$ can be performed in non-real-time, e.g., using one or more background threads. Some embodiments improve robustness or noise reduction by combining results for multiple different images to reject outliers. For example, the quantities $R_{FACE \to HMD}(i)$ and $T_{HMD \to CAMERA}(i)$ can be computed over a sliding average of a predetermined number (N) of frames in which an ICP algorithm or a visual matching algorithm produced the highest scores over a time window.

In embodiments in which the HMD 1010 does not provide information indicating the 6DoF pose of the HMD 1010, the HMD pose in world space, $P_{HMD}(i)$, is not known and cannot be used to determine the 3-D pose of the user 1015. Consequently, matching operations disclosed above are performed for the HMD 1010 in real time to determine $P_{HMD,MATCH}(i)$ in every image. The real-time matching algorithm attempts to avoid intermediate bad matches. In some embodiments, real-time matching is performed using a previous matching result (e.g., a previous result of ICP matching performed on a previous image) as a starting pose for the current image unless the matching score is too low for the previous image, in which case the matching algorithm can reset and restart from a different previous image that had a higher matching score. Instead of using all of the available points from the 3-D model and the incoming data stream of images, a subset of the points in the 3-D model and the incoming data stream are used by the matching algorithm to maintain a high matching speed. Reliable previous matches (typically from frontal views) can be used to assemble a combined model of the HMD 1010 and the face of the user 1015. The combined model can be tracked reliably even at oblique angles.

Once the 3-D pose of the user 1015 in the coordinate system 1020 has been determined, portions of the 3-D model of the user 1015 that correspond to the portions of the user's face that are occluded by the HMD 1010 are rendered and used to replace the corresponding pixels in the images acquired by the camera 1005. In some embodiments, the system attempts to use as much original data as possible and only synthesizes occluded regions based on the 3-D model of the user 1015. For example, the jaw and forehead region of the user 1015 can be displayed using the corresponding pixels in the images acquired by the camera 1005, whereas the eye-nose region is synthesized based on the 3-D model of the user 1015.

In some embodiments, the portion of the user's face rendered from the 3-D model is assigned a translucency before being overlaid with the original images. For example, the translucency can be indicated by a value $0 \le \alpha \le 1$, where smaller values of $\alpha$ indicate a higher degree of transparency of the rendered portion of the user's face. Higher degrees of transparency result in more of the original image being visible in the final combined image. Sharp rendering edges can be avoided by decreasing the value of $\alpha$ from $\alpha \sim 1$ at the center of the HMD 1010 to $\alpha \sim 0$ at the edge of the HMD 1010. This approach can also conceal small alignment errors because portions of the HMD 1010 that remain visible in the final combined images can hide artifacts such as seam breaks in the rendered portion of the user's face.

The user 1015 wearing the HMD 1010 can be presented in 3-D, e.g. in a 3-D model of a scene presented on a VR device. Headset removal can then be performed in either a one-pass approach or a two-pass approach. In the one-pass approach, values of $\alpha$ are assigned to triangles that represent the HMD 1010 based on proximity. For example, the location of the HMD 1010 can be determined as discussed above and the values of $\alpha$ can be assigned to triangles based on their location so that triangles in the center of the HMD 1010 are highly transparent and triangles near the edge of the HMD 1010 are nearly opaque. The triangles derived from the 3-D model of the face of the user 1015 are then solidly added to the scene mesh (with $\alpha=1$) so that the triangles representative of the face appear behind the translucent triangles representative of the HMD 1010. In the two pass-approach, the 3-D representation of the user 1015 wearing the HMD 1010 is rendered first. A translucent model of the face of the user 1015 (including the occluded portion of the user's face) is subsequently rendered on top of the 3-D representation of the user 1015.

FIG. 11 illustrates matching a 3-D model 1100 of a face to a captured image 1105 of a face that is partially occluded by an HMD 1110 according to some embodiments. The matching algorithm illustrated in FIG. 11 is implemented in some embodiments of the processor 820 shown in FIG. 8.

The 3-D model 1100 is acquired from an eye gaze database. For example, the 3-D model 1100 can be the reference model 510 stored in the eye gaze database 500 shown in FIG. 5. The 3-D model 1100 is characterized by position and orientation that are collectively indicated by the arrow 1115. The matching algorithm selects portions of the 3-D model 1100 that are used to perform the comparison with the captured image 1105. For example, the matching algorithm can select a portion 1120 that corresponds to a forehead region of the user and a portion 1125 that corresponds to a nose/mouth/jaw region of the user. The portions 1120, 1125 are unlikely to be occluded by the HMD 1110 and are therefore good candidates for matching to the image 1105.

The captured image 1105 of the face is characterized by a position and orientation that are collectively indicated by the arrow 1130. The matching algorithm determines a rotation 1135 that characterizes the relative position or orientation of the 3-D model 1100 and the captured image 1105 by comparing the portions 1120, 1125 to pixels in the captured image 1105, as discussed herein. For example, the matching algorithm uses the comparison of the 3-D model 1100 and the captured image 1105 to generate a rotation matrix such as the transform matrix $R_{HMD \to FACE}(i)$ discussed above.

FIG. 12 illustrates matching a 3-D model 1200 of an HMD to a captured image 1205 of an HMD 1210 according to some embodiments. The matching algorithm illustrated in FIG. 12 is implemented in some embodiments of the processor 820 shown in FIG. 8.

The 3-D model 1200 is characterized by position and orientation that are collectively indicated by the arrow 1212. The matching algorithm uses features in the 3-D model 1200 to perform the comparison with the captured image 1205. For example, the 3-D model 1200 shown in FIG. 12 includes an Aruco marker 1215. As used herein, the term "Aruco marker" is used to refer to an array of squares having a predetermined number of rows or columns. Values (e.g., black or white) of the squares are determined based on Hamming codes and the values are chosen so that the Aruco code has an identifiable orientation. Thus, a detected orientation of the Aruco marker 1215 can be used to determine the orientation 1212 of the 3-D model 1200. In some embodiments, other features of the HMD, such as edges, corners, logos, and the like are used (in combination with or instead of) the Aruco marker 1215.

The captured image 1205 of the HMD is characterized by a position and orientation that are collectively indicated by the arrow 1220. The HMD has an Aruco marker 1225 that is displayed on a portion of the HMD that is visible in the captured image 1205. The Aruco marker 1225 has the same pattern as the Aruco marker 1215 in the 3-D model 1200. The matching algorithm determines a rotation 1230 that characterizes the relative position or orientation of the 3-D model 1200 and the captured image 1205. The rotation 1230 is determined by comparing the orientation of the Aruco marker 1215 in the 3-D model 1200 to pixels in the captured image 1205 of the HMD, as discussed herein. The matching algorithm uses the comparison of the 3-D model 1200 and the captured image 1205 to determine a transform between the camera coordinate system and the HMD coordinate system. For example, the comparison can be used to determine the transform $T_{HMD \to CAMERA}(i)$ discussed above.

Figure 13:
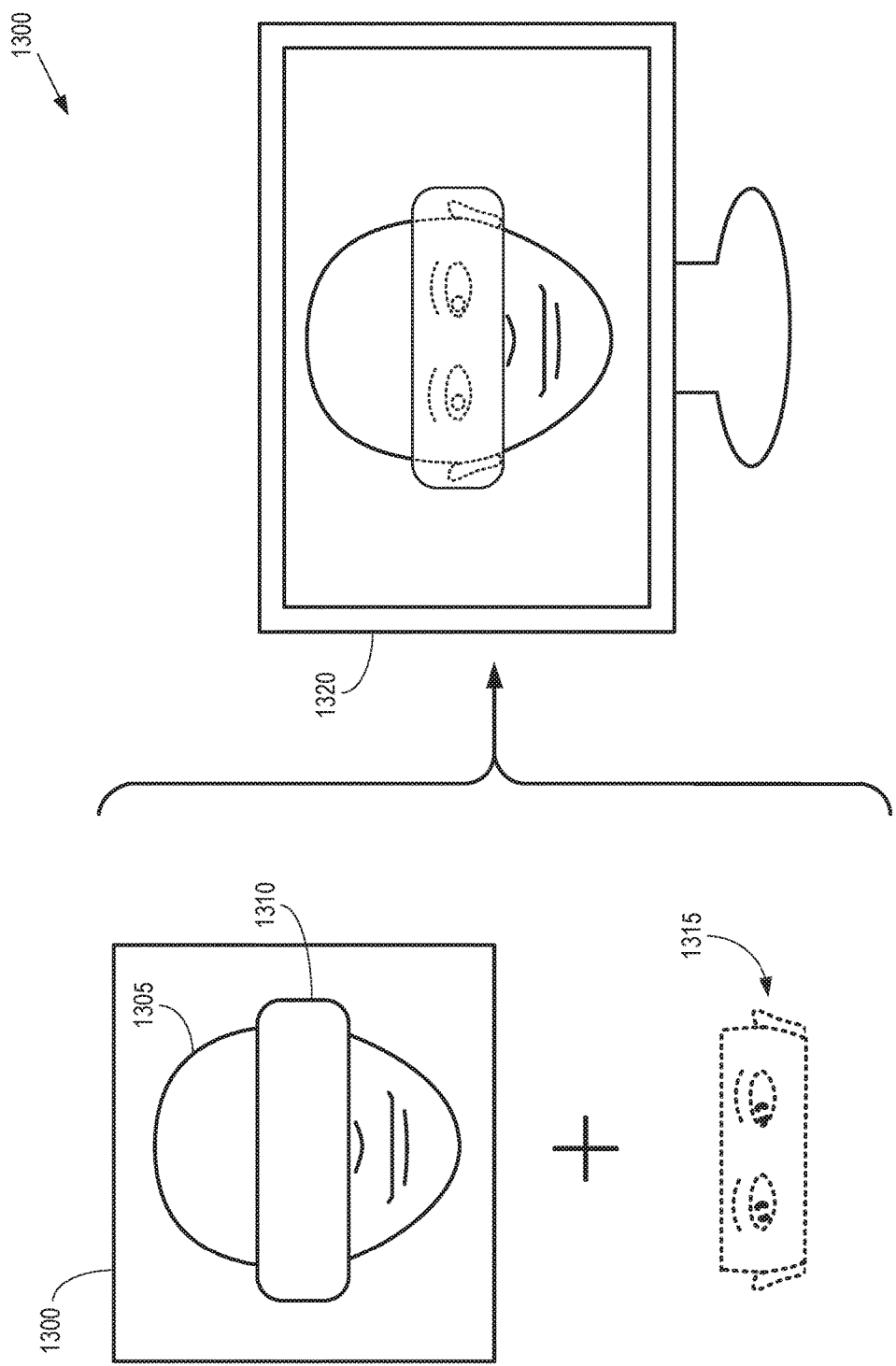
FIG. 13 illustrates headset removal performed on an image of a user that is wearing an HMD that occludes a portion of the user's face according to some embodiments.

FIG. 13 illustrates headset removal performed on an image 1300 of a user 1305 that is wearing an HMD 1310 that occludes a portion of the user's face according to some embodiments. The image 1300 is captured by some embodiments of the camera 810 shown in FIG. 8 and the headset removal is performed by some embodiments of the processor 820 shown in FIG. 8.

The processor renders an image 1315 of a portion of the user's face that is occluded by the HMD 1310. For example, an eye gaze direction for the user 1305 during a time interval corresponding to the image 1300 can be determined using an eye tracker implemented in the HMD 1310. The eye gaze direction is used as an index into an eye gaze database, such as the eye gaze database 500 shown in FIG. 5. The processor is therefore able to access a face sample corresponding to the eye gaze direction for the user 1305 in the image 1300. A blink model can be accessed from the eye gaze database if the user's eyes are closed. The processor is also able to access a reference model of the user's face from the eye gaze database. Textures from the face sample (or blink sample) are mapped to the geometry of the reference model to generate the image 1315 of the occluded portion of the user's face. Rendering the image 1315 from the face sample (or blink sample) and the reference model is performed based on the position and orientation of the user 1305 in the coordinate system of the camera that acquires the image 1300. The position and orientation of the user 1305 is determined according to embodiments of the techniques disclosed herein.

The captured image 1300 and the rendered image 1315 are combined to produce an image for presentation on a display 1320. In some embodiments, the rendered image 1315 is associated with a translucency, which can vary depending on the position of a portion of the rendered image 1315 relative to the HMD 1310. For example, the translucency of the rendered image 1315 can be low near the center of the HMD 1310 so that the combined image is determined predominantly by pixel values in the rendered image 1315 and the translucency of the rendered image 1315 can be high near the edges of the HMD 1310 so that the combined image is determined predominantly by pixel values in captured image 1300 of the HMD 1310 near the edges of the HMD 1310.

Figure 14:
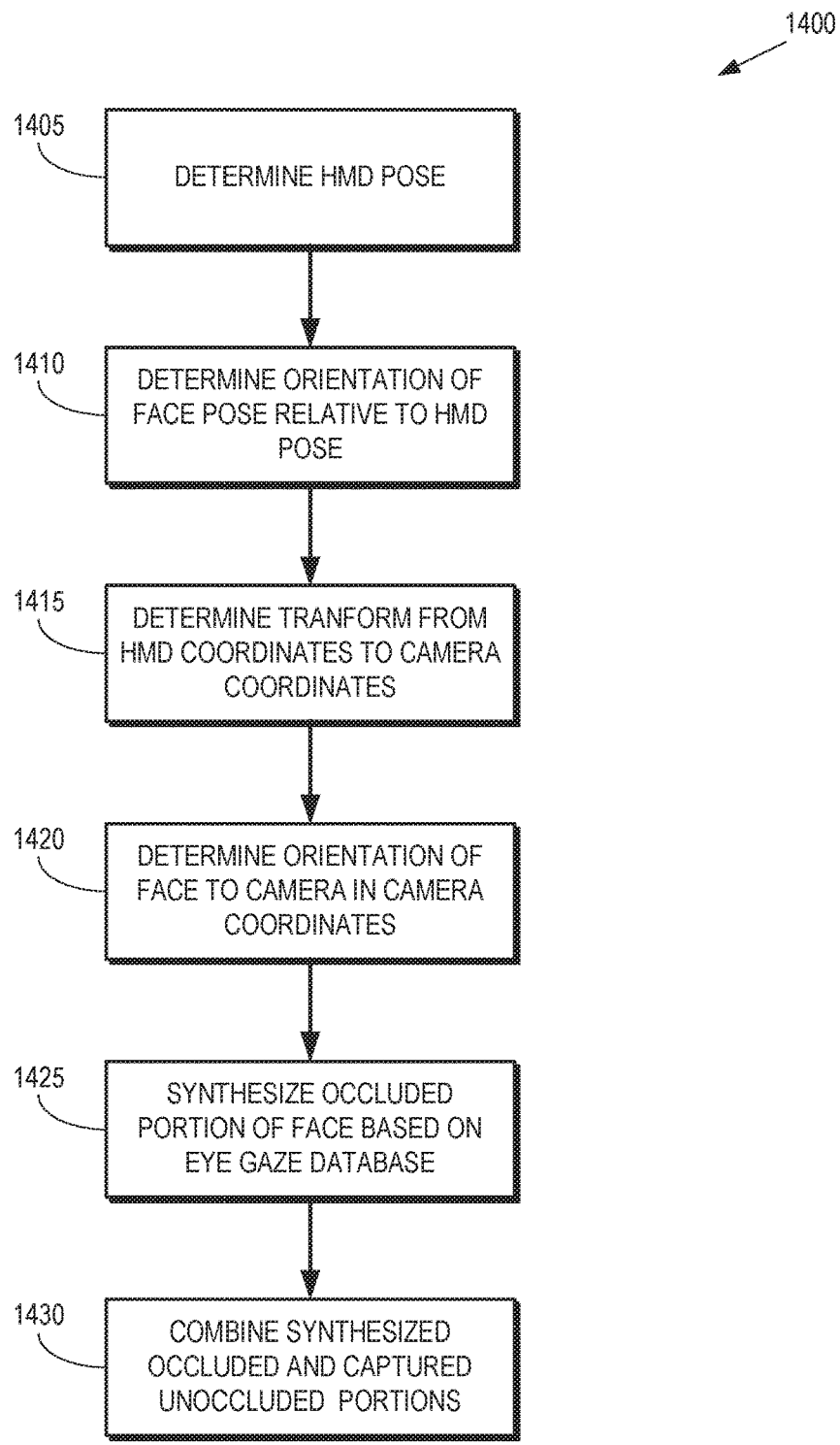
FIG. 14 is a flow diagram of a method of performing headset removal according to some embodiments.

FIG. 14 is a flow diagram of a method 1400 of performing headset removal according to some embodiments. The method 1400 is implemented in some embodiments of the processor 820 shown in FIG. 1. In the illustrated embodiment, headset removal is performed for an HMD that is occluding a portion of a face of the user in images of a scene acquired by a camera. The HMD is configured to provide 6DoF pose information in real-time. The 6DoF pose of the HMD is therefore used as a proxy for the pose of the user in the coordinate system of the camera that is acquiring images including the user, e.g., as discussed herein with regard to FIG. 10. The method 1400 can also be modified to perform headset removal for an HMD that is not configured to provide 6DoF pose information, e.g., as discussed herein with regard to FIG. 10.

At block 1405, the processor determines a pose of the HMD. For example, the pose of the HMD can be determined based on the 6DoF pose information generated by the HMD and transmitted to the processor in real-time. The pose of the HMD is determined in a coordinate system associated with the HMD such as coordinates in world space. The coordinate system associated with the HMD is typically different than a coordinate system associated with a camera used to capture images of the scene including the user.

At block 1410, the processor determines an orientation of a pose of the user's face relative to the pose of the HMD. The pose of the user's face can be based on a pose of the user's face determined in the coordinates of the camera, e.g., by applying a matching algorithm to the captured image and a 3-D model of the user's face as discussed herein with regard to FIGS. 10 and 11. The orientation of the pose of the user's face relative to the pose of the HMD can be represented as a rotation matrix, as discussed herein. Some embodiments of the HMD include sensors that can be used to determine (or improve a determination of) the pose of the user's face relative to the pose of the HMD.

At block 1415, the processor determines a transform between the coordinates associated with the HMD and the coordinates in the camera's frame of reference. The processor can determine the transform based on the results of applying a matching algorithm to the captured image and a 3-D model of the HMD. For example, the transform can be determined by comparing orientations of an Aruco marker in the 3-D model of the HMD and the same Aruco marker that is deployed on the HMD and visible in the captured image.

At block 1420, the processor determines an orientation of the user's face to the camera in the camera coordinates. For example, the processor can determine the orientation of the user's face in the camera coordinates by applying the rotation matrix that defines the relative orientation of the user's face and the HMD in combination with the transform between the coordinates associated with the HMD and the coordinates in the camera's frame of reference.

At block 1425, the processor synthesizes an occluded portion of the user's face based on a model retrieved from an eye gaze database such as the eye gaze database 500 shown in FIG. 5. For example, the processor can determine an eye gaze direction for the user in the captured image using signals provided by an eye tracker deployed in the HMD. The processor can then access a face sample using the eye gaze direction as an index into the eye gaze database. The face sample and, in some cases, a reference model are used to render an image that represents the occluded portion of the user's face.

At block 1430, the processor combines the synthesized image representative of the occluded portion of the user's face and the captured image representative of the unoccluded portion of the user's face to form a final image. For example, the synthesized image can be applied to, overlaid with, or used to replace pixels in the captured image that correspond to the occluded portion of the user's face. A translucency can be applied to the synthesized image before combining the synthesized image with the captured image, as discussed herein.

Figure 15:
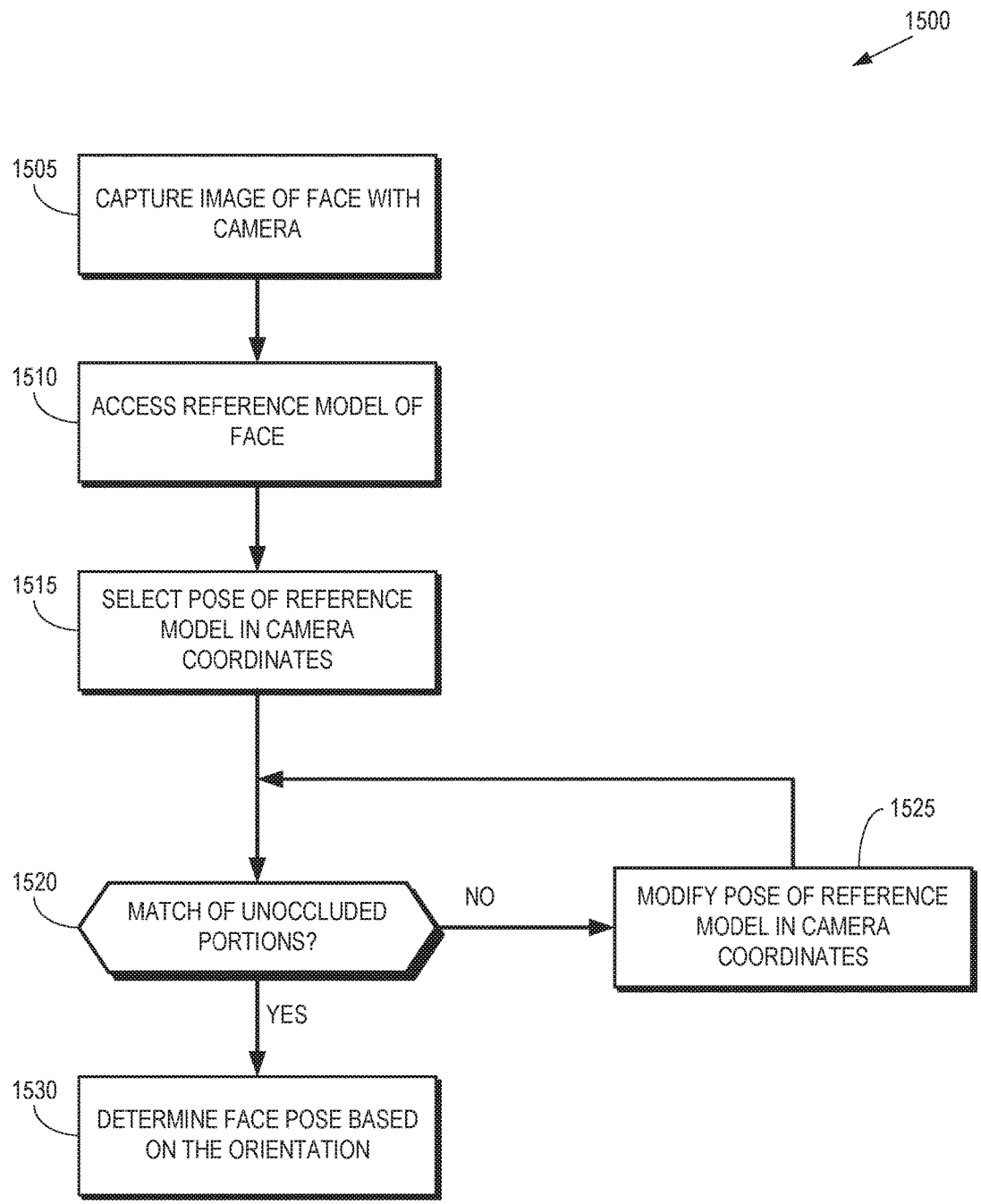
FIG. 15 is a flow diagram of a method of determining a pose of a partially occluded face in an image in a coordinate system of a camera that acquires the image according to some embodiments.

FIG. 15 is a flow diagram of a method 1500 of determining a pose of a partially occluded face in an image in a coordinate system of a camera that acquires the image according to some embodiments. The method 1500 is implemented in some embodiments of the processor 820 shown in FIG. 1. The method 1500 can be performed in a non-real time (e.g., as a background thread or pre-process) in cases in which the occluding HMD is configured to provide 6DoF pose information in real-time and can therefore be used as a proxy for the position and orientation of the user's face. The method 1500 can also be performed in real time in cases in which the occluding HMD is not configured to provide 6DoF pose information and the pose of the user's face needs to be determined for each image captured by the camera.

At block 1505, the camera captures an image of a scene including the user's face. In the scene, the user is wearing an HMD that occludes a portion of the user's face.

At block 1510, the processor accesses a reference model of the user's face. For example, the processor can retrieve the reference model from an eye gaze database such as the eye gaze database 500 shown in FIG. 5.

At block 1515, the processor chooses a candidate pose (e.g., position and orientation) of the reference model in the coordinate system associated with the camera. The candidate pose of the reference model corresponds to a candidate pose of the user's face.

At decision block 1520, the processor determines whether unoccluded portions of the reference model (e.g., the forehead of the user and the mouth/jaw region of the user) match with corresponding portions in the captured image. In a 2-D comparison, the reference model is rendered from the perspective of the camera to generate pixels representative of the 3-D model of the user's face in the candidate orientation. The rendered image is then compared to the captured image to generate a matching score. In a 3-D comparison, an ICP algorithm is used to compare the 3-D reference model with the captured image including depth information for each pixel and generate a matching score. A relatively high value of the matching score, such as a matching score above a threshold, indicates a match. If the processor detects a match, the method 1500 flows to block 1525. If the processor does not detect a match, the method 1500 flows to block 1530.

At block 1525, the processor determines the pose of the user's face based on the pose of the reference model that produced the high value of the matching score.

At block 1530, the processor modifies the orientation of the reference model in the camera coordinates to generate a new candidate orientation. The method 1500 then flows back to decision block 1520 to determine whether the modified orientation produces a match. Although the blocks 1515, 1520, 1525 are depicted as a loop in which a potential match for each candidate orientation is assessed prior to generating a new candidate orientation, some embodiments of the method 1500 determine matching scores for each candidate orientation prior to determining which of the candidate orientations best matches the captured image. For example, the method 1500 generate matching scores for a set of candidate orientations and then select the highest matching score from among the set of candidate orientations to determine the pose of the user's face at block 1530.

Figure 16:
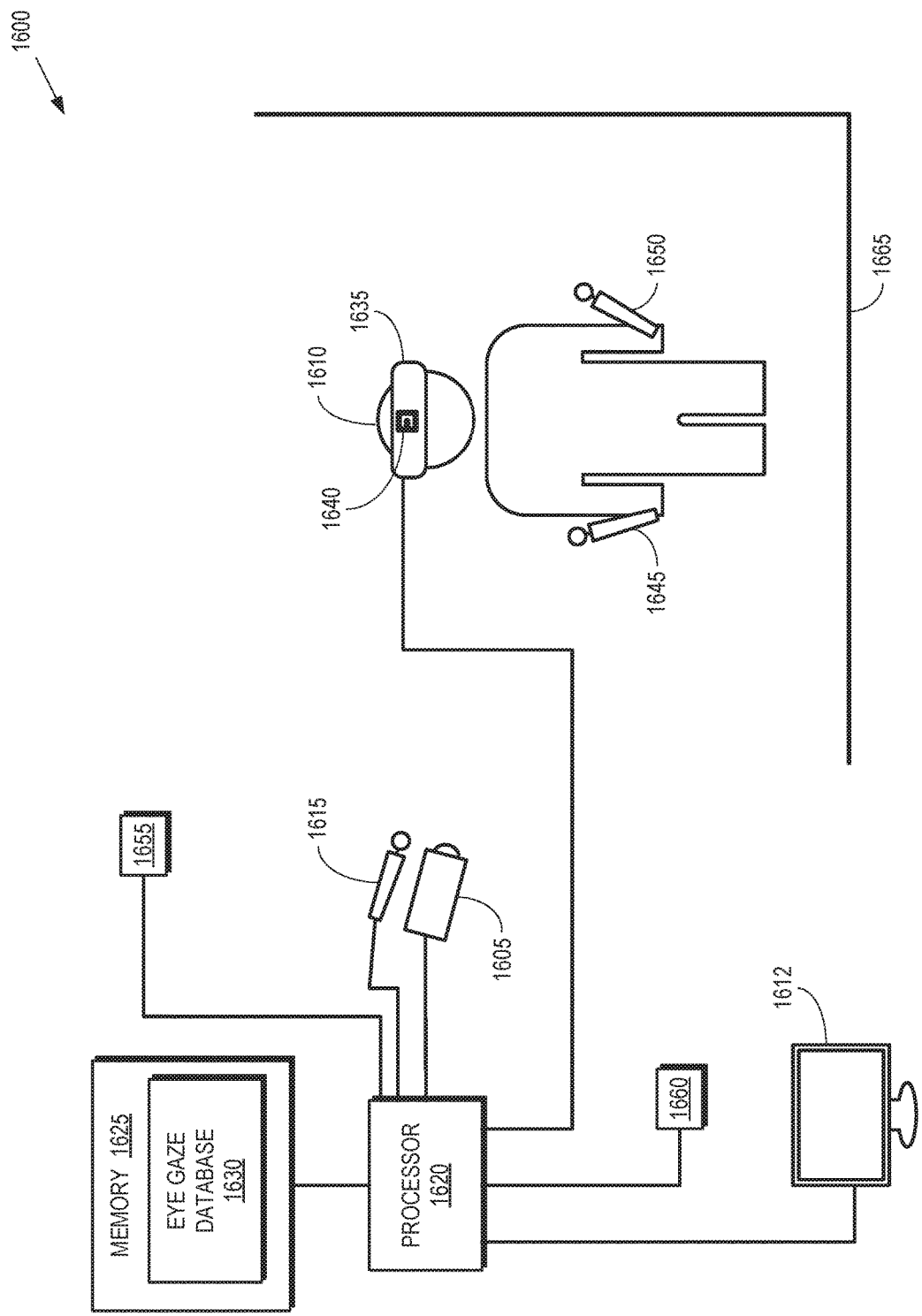
FIG. 16 is a block diagram of an end-to-end system for performing headset removal in mixed reality (MR) according to some embodiments.

FIG. 16 is a block diagram of an end-to-end system 1600 for performing headset removal in mixed reality (MR) according to some embodiments. In a mixed reality, an image or avatar of a user 1610 and a virtual context of the user 1610 are shared in a flat video format that can be viewed by an audience or other participant in the mixed reality scene, e.g., using a display or screen 1612. The end-to-end system 1600 includes a camera 1605 that is used to capture images of a scene including the user 1610. The camera 1605 is implemented as an RGB camera that generates an image represented by RGB values of pixels in the image, an RGBD camera that generates an image represented by the RGB values of the pixels in the image and depth values that represent a distance between the camera 1605 and a portion of the scene that is represented by the corresponding pixels, or other types of cameras. Some embodiments of the camera 1605 are video cameras that capture a configurable number of images per second, e.g., the camera 1605 can capture images at 60 FPS, 90 FPS, 120 FPS, or at other higher or lower rates. Some embodiments of the camera 1605 are attached to a tracker 1615, such as a 6DoF VR tracker, that is used to determine a position and orientation of the camera 1605.

The end-to-end system 1600 also includes a processor 1620 and a memory 1625. The processor 1620 is configured to execute instructions, such as instructions stored in the memory 1625 and store the results of the instructions in the memory 1625. The processor 1620 can be implemented as an individual processor or as a distributed set of processors. The processor 1620 is configured to receive an image stream that includes information representative of the images captured by the camera 1605, such as RGB values, depth values, and the like for each of the pixels in the images. The processor 1620 can store the received information in the memory 1625. The processor 1620 is also configured to generate mixed reality images based on the information received from the camera 1605 or information accessed from the memory 1625.

An eye gaze database 1630 is stored in the memory 1625 and the processor 1620 is able to access information in the eye gaze database 1630 from the memory 1625. The eye gaze database 1630 is produced using some embodiments of the processing system shown in FIG. 1. For example, the eye gaze database 1630 is generated using some embodiments of the method 600 shown in FIG. 6 and the method 700 shown in FIG. 7. Some embodiments of the eye gaze database 1630 are generated prior to performing headset removal using a processing system that differs from the end-to-end system 1600. For example, the user 1610 can perform a capture process to generate the eye gaze database 1630 prior to engaging in the MR session using the end-to-end system 1600. In cases where the eye gaze database 1630 is generated using a pre-process, the eye gaze database 1630 can be stored in a non-transitory computer readable media, which can include memory elements such as RAM implemented in a cloud, digital video discs (DVDs), flash memory, and the like. The stored eye gaze database 1630 can subsequently be transferred or copied to the memory 1625. For example, the eye gaze database 1630 can be downloaded from the cloud via wired or wireless communication links, a DVD storing the eye gaze database 1630 can be accessed using a disk drive implemented in the end-to-end system 1600, a flash memory including the eye gaze database 1630 can be inserted in a USB port in the end-to-end system 1600, and the like. Alternatively, the end-to-end system 1600 can be configured to generate the eye gaze database 1630, e.g., using some embodiments of the method 600 shown in FIG. 6 and the method 700 shown in FIG. 7. In cases where the eye gaze database 1630 is generated by the end-to-end system 1600, the eye gaze database 1630 is stored directly in the memory 1625.

The user 1610 is wearing an HMD 1635 that includes one or more distinguishing features such as an Aruco marker 1640. The HMD 1635 is connected to the processor 1620 so that the processor 1620 and the HMD 1635 in exchange signals over the connection. The connection can be a wired connection (e.g., a tether) or a wireless connection. In some embodiments, the HMD 1635 provides a telemetry stream that includes information such as 6DoF pose information to the processor 1620 over the connection. The processor 1620 can use the telemetry stream to determine the pose of the HMD 1635 in real-time. The HMD 1635 also includes an eye tracker for tracking eye gaze directions of the user's eyes. Information indicative of the eye gaze directions are transmitted over the connection from the HMD 1635 to the processor 1620 in an eye gaze stream. The processor 1620 can use the eye gaze stream of eye gaze directions to determine the eye gaze direction for the user's eyes in real-time.

In some embodiments, the user 1610 holds one or more VR controllers such as the 6DoF VR controllers 1645, 1650 shown in FIG. 16. The end-to-end system 1600 can therefore also include one or more VR trackers 1655, 1660 that are used to track the positions and orientations of the VR controllers 1645, 1650. The VR trackers 1655, 1660 can also be used to track the VR tracker 1615 that is attached to the camera 1605. The tracking information for the VR tracker 1615 can be used to improve calibration of the relative positions and orientations of the camera 1605 and the HMD 1635, as discussed herein. The user 1610 in the illustrated embodiment is positioned in front of a green screen 1665 to support chroma key compositing of images of the user 1610 with other virtual images to produce the mixed reality experience. In some embodiments, the green screen 1665 is not used. Instead, an RGBD sensor that is calibrated to the camera 1605 can be used to perform an accurate segmentation of the user 1610 from background pixels, e.g., based on the relative depths of the foreground and background pixels. Alternatively, machine learning techniques can be used to perform segmentation of the user 1610 from the background using only RGB information.

As discussed herein, the "brick-in-the-face" appearance of the user 1610 wearing the HMD 1635 can disrupt the sense of immersion for the user 1610 or other users that are participating in the mixed reality experience provided by the end-to-end system 1600. In order to improve the sense of immersion for all of the participants, the end-to-end system 1600 is configured to perform headset removal on the HMD 1635 that is worn by the user 1610 in the images captured by the camera 1605. The post-headset removal images are then merged with corresponding virtual reality images and, in some cases post-headset removal images of other users, to form mixed reality images. Some embodiments of the processor 1620 are therefore configured to access a first stream of information representing telemetry of a pose of the HMD 1635, a second stream of information representing eye gaze directions of the user 1610, and a third stream of information representing a plurality of images of the scene captured by the camera 1605. The processor 1620 is configured to render 3-D models of a first portion of the user's face that is occluded by the HMD 1635 in the captured images based on the first, second, and third streams. The processor 1620 is further configured to generate mixed reality images by combining virtual reality images, a second portion of the user's face that is not occluded by the HMD in the captured images, and the rendered 3-D models of the occluded portion of the user's face.

In some embodiments, the user 1610 is represented by a live 3-D representation that can be computed using a textured point cloud, a textured mesh, and the like. The 3-D representation can be computed using an RGBD sensor, a stereo camera pair, or applying machine learning to learn models of humans that can then be used to generate the 3-D representation. The 3-D representation of the user 1610 can then be composited into the mixed reality scene. Using the 3-D representation can result in a more realistic merging of the real and virtual worlds. For example, the 3-D representation provides an accurate depth for each pixel associated with the user 1610. For another example, the 3-D representation allows the end-to-end system 1600 to produce the correct lighting interactions between the virtual world and the user 1610.

FIG. 17 is a diagram illustrating an arrangement 1700 that is used to perform automatic calibration between a camera 1705 and a pose of an HMD according to some embodiments. The calibration can be performed by a processor 1708 that can be implemented using some embodiments of the processor 1620 shown in FIG. 16. In the illustrated embodiment, the camera 1705 is connected to a VR tracker 1730 so that the position and orientation of the camera 1705 can be determined by tracking the position and orientation of the VR tracker 1730. However, the VR tracker 1730 is optional and not required to perform the automatic calibration.

The arrangement 1700 depicts the HMD in three different orientations 1710, 1715, 1720. In the first orientation 1710, the HMD is located at a position and orientation indicated by the arrow 1725, which indicates that the first orientation 1710 is face-on to the camera 1705. In the second orientation 1715, the HMD is located at a position and orientation indicated by the arrow 1730, which indicates that the second orientation 1715 is rotated by an angle 1735 about an axis that is perpendicular to the plane of the drawing with respect to the first orientation 1710. In the third orientation 1720, the HMD is rotated about an axis indicated by the arrow 1725, e.g., an axis that is in the plane of the drawing, as indicated by the arrow 1740. In some embodiments, additional positions or orientations included to improve the calibration.

The calibration is performed on the basis of distinguishing features of the HMD in the different orientations 1710, 1715,

1720. For example, the calibration can be performed on the basis of an Aruco marker 1745 that is affixed to a surface of the HMD. For another example, the calibration can be performed on the basis of a logo or other specific geometric features of the HMD such as edges, corners, cable connectors, and the like. Offsets of the Aruco marker 1745 or other geometric features relative to a center (or other reference point) on the HMD can be measured manually and stored for subsequent access by the processor 1708.

The camera 1705 captures images 1750, 1755, 1760 of the HMD in the corresponding orientations 1710, 1715, 1720. For each feature detected in the captured images 1750, 1755, 1760, the processor 1708 is configured to determine a 3-D location of the feature in the HMD coordinate system using a pose of the HMD for the corresponding orientations 1710, 1715, 1720 and the measured offsets. As discussed herein, the processor 1708 is able to acquire the pose information for the HMD in a telemetry stream received from the HMD. The processor 1708 is also able to identify pixel locations of the features in the captured images 1750, 1755, 1760. The 3-D location and pixel locations of the feature form a 2-D/3-D point pair. The processor 1708 is therefore able to generate a set of 2-D/3-D point pairs from the captured images 1750, 1755, 1760 and the corresponding pose information. The set of 2-D/3-D point pairs is then used to determine a projection matrix that projects the 3-D features onto the 2-D image plane of the camera 1705. In some embodiments, the set of 2-D/3-D point pairs includes images taken from different positions by a moving camera 1705 and the locations of the camera when the images were acquired. The projection matrix can subsequently be used by the calibrated camera 1705 to determine a 3-D location and orientation of the HMD based on a 2-D image of the HMD including the features represented in the projection matrix.

Figure 18:
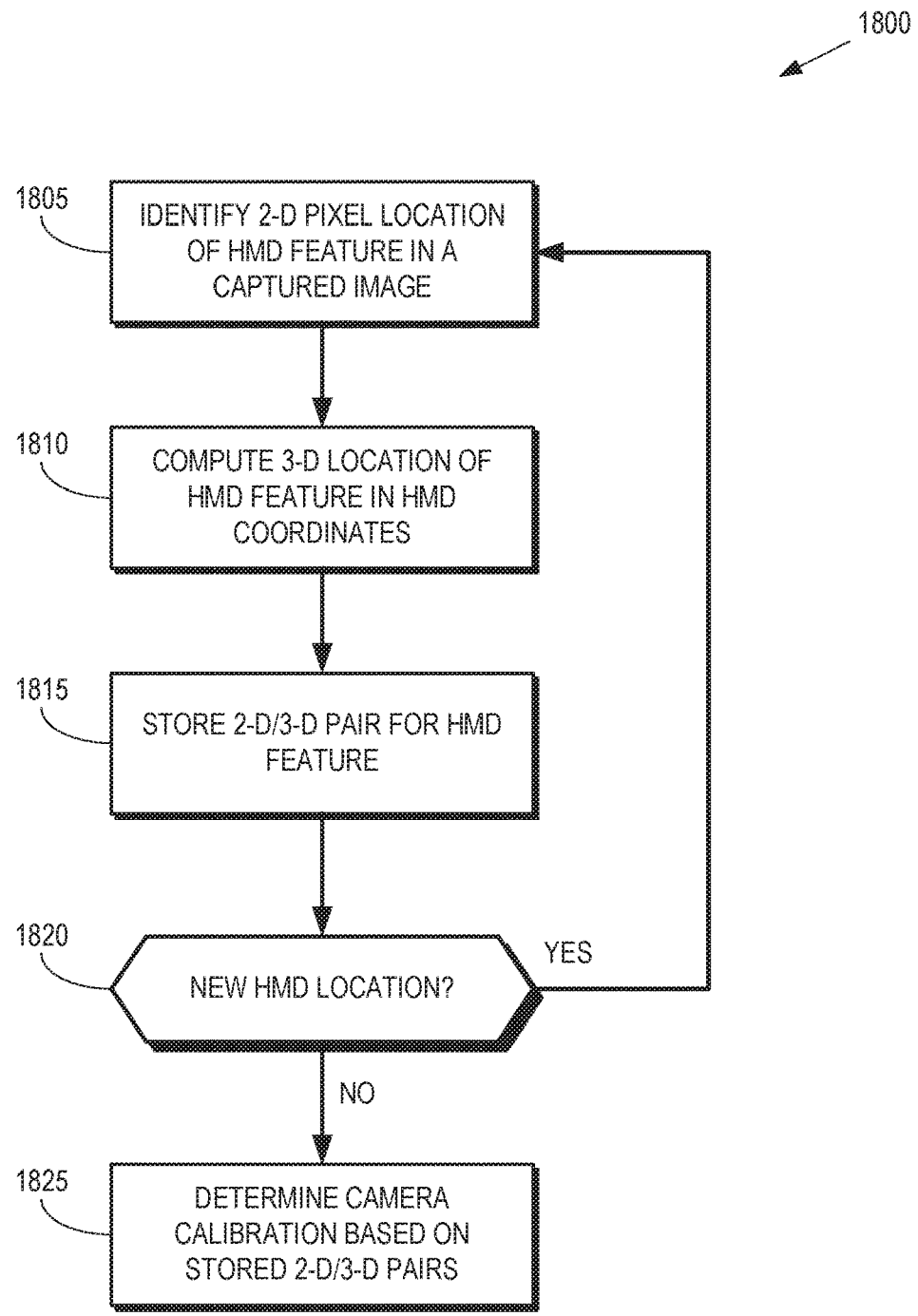
FIG. 18 is a flow diagram of a method for calibrating a camera that is used to capture images of a user wearing an HMD in an end-to-end mixed reality system according to some embodiments.

FIG. 18 is a flow diagram of a method 1800 for calibrating a camera that is used to capture images of a user wearing an HMD in an end-to-end mixed reality system according to some embodiments. The method 1800 is implemented in a processor such as some embodiments of the processor 1620 in the end-to-end system 1600 shown in FIG. 16 for the processor 1708 shown in FIG. 17. The method 1800 is applied to images of features of the HMD in different orientations, e.g., as depicted in the arrangement 1700 shown in FIG. 17.

At block 1805, the processor identifies 2-D pixel locations of one or more HMD features in a captured image that includes the HMD in a first location and orientation. For example, the processor can identify 2-D pixel locations of HMD features in an image of an Aruco marker such as the Aruco marker 1745 shown in FIG. 17. The processor can also identify 2-D pixel locations of other HMD features, either in addition to or instead of identifying 2-D pixel locations of an Aruco marker.

At block 1810, the processor determines 3-D locations of the HMD features in the captured image in HMD coordinates. The 3-D locations of the HMD features can be determined by computing a central point (or other reference point) of the HMD using pose information in a telemetry stream provided to the processor by the HMD. Previously measured offsets of the HMD features with respect to the central point (or other reference point) are then combined with the 3-D location of the central point (or other reference point) to determine the 3-D locations of the HMD features.

At block 1815, the processor stores a 2-D/3-D point pair that includes information indicating the 2-D location of each pixel associated with the HMD feature and a corresponding 3-D location of the portion of the HMD feature represented by the pixel.

At decision block 1820, the processor determines whether there are additional images associated with a new HMD location to process. The new HMD location can indicate a new position or orientation of the HMD and, in cases where the camera is mobile, a new position orientation of the camera. If there are additional images to process, the method 1800 flows back to block 1805. If there are no additional images to process, the method flows to block 1825.

At block 1825, the processor determines a camera calibration that establishes a relationship between the HMD features detected in images captured by the camera and the HMD pose corresponding to the captured image. The processor determines the camera calibration based on the set of 2-D/3-D point pairs. For example, the processor can determine a projection matrix using a standard technique of minimizing the re-projection error such that a sum of squared differences between the projection of the 3-D point associated with a feature and the pixel in which the feature was detected.

The camera calibration generated by the method 1800 can then be used to generate mixed reality images including a user wearing the HMD by merging one or more VR images with images captured by the camera and a synthesized representation of a portion of the user's face that is occluded by the HMD. Streams including information representing the VR images, the captured images, and the synthesized representations can be synchronized. For example, a timing reference used by the processor can be synchronized with a timing reference used by the HMD can be determined on the basis of a cross-correlation of related events that occur at the HMD and are detected by the processor in the captured images of the HMD.

Figure 19:
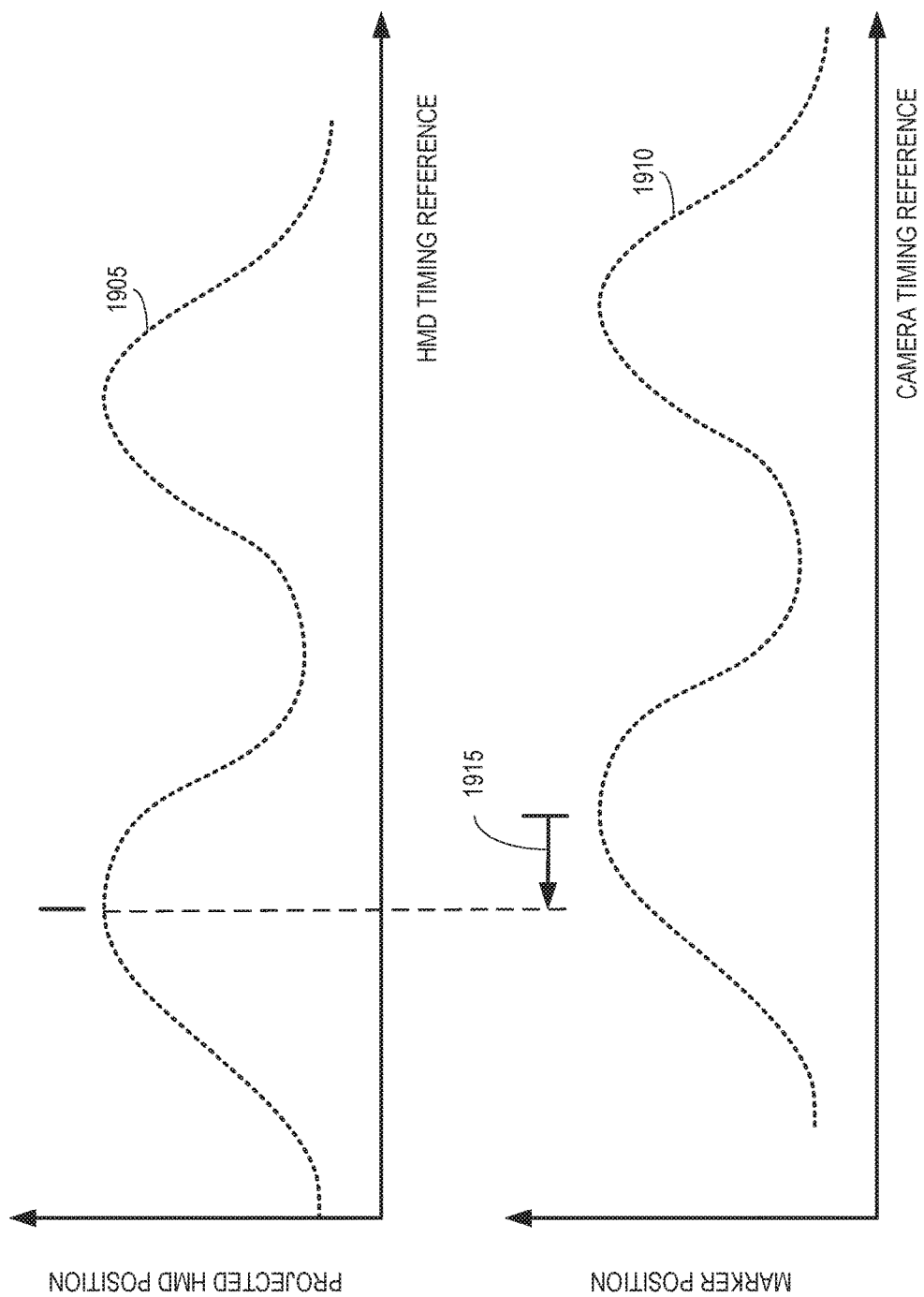
FIG. 19 illustrates variations of measured parameters associated with motion of an HMD and images of the moving HMD according to some embodiments.

FIG. 19 illustrates variations of measured parameters associated with motion of an HMD and images of the moving HMD according to some embodiments. In the illustrated embodiment, the HMD is moved in front of an RGB camera parallel to the RGB image plane. The 3-D HMD position is indicated in a telemetry stream received by a processor from the HMD. The 3-D HMD position is projected onto the RGB camera image plane on the basis of a projection matrix determined by a camera calibration process such as the method 1800 shown in FIG. 18. The telemetry stream is time stamped and the projected HMD position 1905 is plotted as a function of the HMD timing reference on the basis of the timestamps in the telemetry stream.

One or more markers (such as an Aruco marker) on the HMD are tracked visually in the RGB camera image plane as the HMD is moved in front of the RGB camera. The images captured by the RGB camera are time stamped using an RGB camera timing reference. The marker position 1910 in the RGB camera image plane is plotted as a function of the RGB camera timing reference. The projected HMD position in 1905 and the marker position 1910 are cross correlated and a peak in the cross-correlation function indicates a delay 1915 between the two signals. The HMD timing reference and the camera timing reference are synchronized by applying a timing offset equal to the delay 1915 detected using the cross-correlation function. The HMD pose information included in the telemetry stream can therefore be synchronized with images captured by the camera.

In some embodiments, synchronization of the HMD timing reference and the camera timing reference can be performed without reference to features or markers on the HMD. For example, stable points on the user or a VR controller can be tracked to determine the timing offset. For another example, if the HMD has an outward facing camera that shares a device clock with the HMD, then the HMD camera stream (and by extension the HMD timing reference) can be synchronized to the camera timing reference by tracking features in the physical environment that are seen by the outward facing camera of the HMD.

Figure 20:
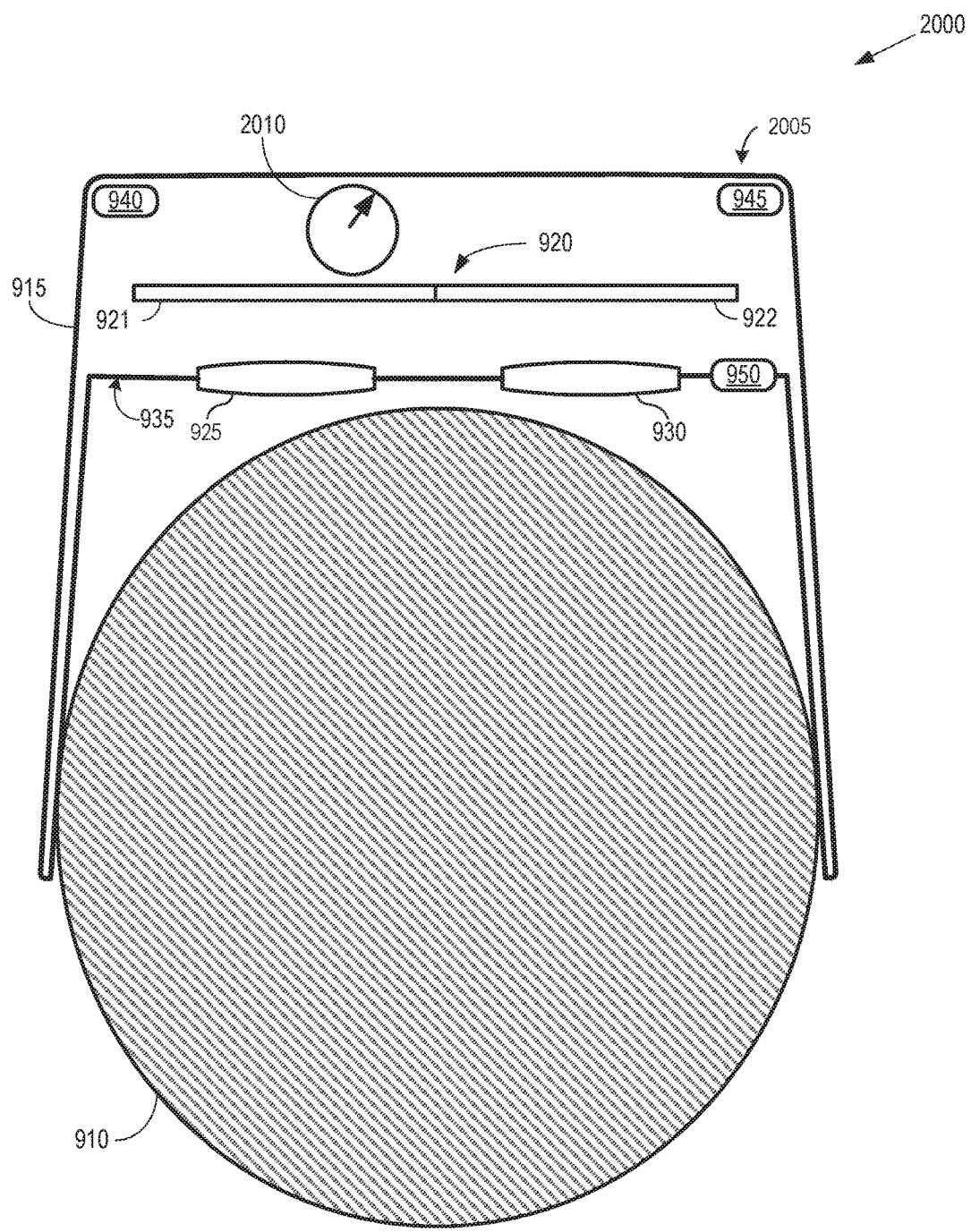
FIG. 20 illustrates a display system that includes an electronic device configured to provide VR, AR, or MR functionality via a display according to some embodiments.

FIG. 20 illustrates a display system 2000 that includes an electronic device 2005 configured to provide VR, AR, or MR functionality via a display according to some embodiments. The illustrated embodiment of the electronic device 2005 is similar to the embodiment of the electronic device 905 shown in FIG. 9. The functional elements of the electronic device 2005 are therefore the same or similar to the functional elements of the electronic device 905 that are indicated by the same reference numerals. The electronic device 2005 also includes a clock 2010 that provides an internal timing reference for operation of the functional elements of the electronic device 2005.

The electronic device 2005 implements an eye tracker 950 that is configured to track movements and positions of the eyes of the user 910 by measuring the point of gaze of the user 910 or measuring the motion of the eyes relative to the head of the user 910. The electronic device 2005 is therefore able to generate an eye gaze stream that includes time stamped information representative of the eye gaze directions of the eyes of the user 910. The eye gaze stream can be provided in real time to other devices such as the processor 1620 shown in FIG. 16.

The electronic device 2005 includes sensors 940, 945 that are used to detect a position orientation of the electronic device 905. Although two sensors 940, 945 are shown in the interest of clarity, the electronic device 905 can include more or fewer sensors. The sensors 940, 945 can include accelerometers, magnetometers, gyroscopic detectors, position sensors, infrared sensors, and the like, which can be implemented as micro-electrical-mechanical (MEMS) sensors. The sensors 940, 945 in the electronic device 2005 are able to generate information indicating the six degree-of-freedom (6DoF) pose of the electronic device 2005, which includes a three-dimensional position of the electronic device 2005 and a three-dimensional orientation of the electronic device 2005. The 6DoF pose is generated in a coordinate system defined by the electronic device 2005. The electronic device 2005 is therefore able to generate a telemetry stream that includes time stamped information representative of the 6DoF pose of the electronic device 2005. The telemetry stream can be provided in real time to other devices such as the processor 1620 shown in FIG. 16.

The eye gaze stream and the telemetry stream can be temporally synchronized using the shared clock 2010. However, some embodiments of the electronic device 2005 do not implement a clock that is shared by the eye tracker 950 and the sensors 940, 945. In that case, a cross-correlation can be used to determine an offset between the eye gaze stream and the telemetry stream. For example, the user 910 can move their head rapidly side to side while wearing the electronic device 2005 and while focusing their eyes on one point in the virtual 3-D space. The eye gaze direction detected by the eye tracker 950 is then negatively correlated (in time) to the orientation of the HMD indicated in the 6DoF pose of the electronic device 2005 detected by the sensors 940, 945. Assuming that the eye gaze direction has a value of zero at an origin of the HMD coordinate system and that values of the eye gaze direction to one side of the origin are negative and values of the eye gaze direction are positive to the other side of the origin, the time offset between the eye gaze stream and the telemetry stream can be computed by multiplying the eye gaze direction by −1 to determine a "negative eye gaze direction." A time offset that produces a maximum cross-correlation between the negative eye gaze direction and the orientation of the HMD is used as the time offset between the eye gaze stream and the telemetry stream.

Figure 21:
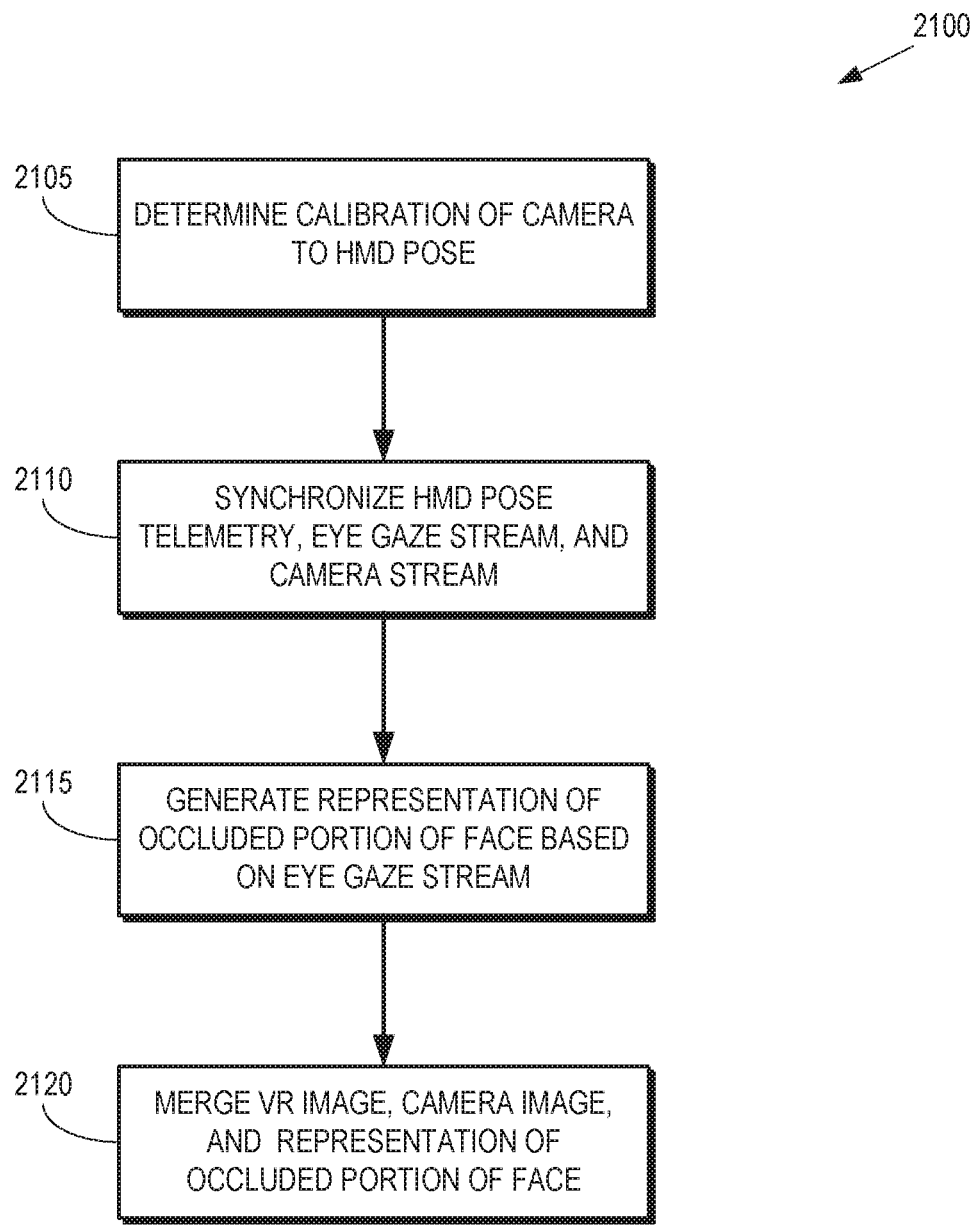
FIG. 21 is a flow diagram of a method of performing headset removal for a user wearing an HMD in a mixed reality scene according to some embodiments.

FIG. 21 is a flow diagram of a method 2100 of performing headset removal for a user wearing an HMD in a mixed reality scene according to some embodiments. The method 2100 is implemented in a processor such as some embodiments of the processor 1620 shown in FIG. 16.

At block 2105, the processor determines a calibration between a camera and an HMD pose. For example, the processor can determine a projection matrix that projects 3-D features of the HMD onto the 2-D image plane of the camera. The projection matrix can be used by the calibrated camera to determine a 3-D location and orientation of the HMD based on a 2-D image of the HMD.

At block 2110, the processor performs a temporal synchronization of the HMD pose telemetry stream, the eye gaze stream, and the camera stream, which can include the images produced by the processor or received at the processor from other sources. For example, the HMD pose telemetry and the eye gaze stream can be synchronized on the basis of a common timing reference such as a clock implemented in the HMD. For another example, the HMD pose telemetry and the camera stream can be synchronized by using a cross-correlation procedure to determine a timing offset between an HMD timing reference and a camera timing reference. The timing offset can then be used to synchronize the HMD and camera timing references and, consequently, the HMD pose telemetry stream and the camera stream.

At block 2115, the processor generates a representation of an unoccluded portion of the user's face based on information included in the eye gaze stream. For example, the processor can determine an eye gaze direction for the user in each image using the temporally synchronized eye gaze data stream. The eye gaze direction is then used as an index into an eye gaze database such as the eye gaze database 1630 shown in FIG. 16. A face sample associated with the eye gaze direction is retrieved from the eye gaze database. A blink sample can also be retrieved from the eye gaze database if the eye gaze data stream indicates that the user is blinking in the corresponding frame. The processor also retrieves a reference model that indicates the geometry of the user's face. Textures from the face samples are combined with the geometry of the reference model to synthesize a representation of the occluded portion of the user's face.

At block 2120, the processor produces each image in the mixed reality scene by merging a VR image of a virtual portion of the mixed reality scene, an image of a scene including the user wearing the HMD captured by the camera, and the representation of the occluded portion of the user's face. Some embodiments of the processor merge the VR image, the captured image, and the representation of the occluded portion of the user's face by overwriting pixels in the VR image or the captured image with pixels that represent the occluded portion of the user's face. As discussed herein, merging the VR image, the captured image, and the representation of the occluded portion of the user's face can also include applying a translucency to the pixels that represent the occluded portion of the user's face. The translucency of a pixel in the representation can vary depending on the relative location of the pixel and the HMD in the captured image.

As discussed herein, calibration of the camera according to the method 1800 shown in FIG. 18 can be used to accurately predict a 3-D location of the HMD in subsequently captured images. However, in some embodiments, small but noticeable errors in the predicted 3-D location of the HMD can persist and detract from the sense of immersion when headset removal is performed on the basis of the camera calibration. For example, users can notice a relative shift of a few millimeters between the synthesized eye region and the other portions of the face represented in the captured image. The errors can be time-dependent (e.g., due to inaccurately reported poses of the HMD or the VR tracker associated with the camera, or inaccurate timing offsets) or time-independent (e.g., due to errors in calibration or radial distortion).

Some embodiments of the processor can compensate for these errors by initially rendering the HMD and the representation of the occluded portion of the user's face on the basis of the camera calibration determined at block 2105 and the HMD pose information in the synchronized HMD pose telemetry stream. The processor can then compensate for any remaining errors using a marker (such as an Aruco marker) and a 3-D model of the HMD. Some embodiments of the processor correct the HMD pose based on a difference between an image rendered from the 3-D model of the HMD and the corresponding image of the HMD captured by the camera. For example, for each image or frame in the MR scene, the processor determines a pixel offset between a predicted HMD position (in the rendered image) and an actual position of the HMD in the captured image. The pixel offset can be determined by comparing a position of a marker (such as an Aruco marker) in the rendered image with the position of the marker in the captured image. The pixel offset can also be determined by comparing an expected silhouette of the HMD in the rendered image with the actual HMD silhouette in the captured image. The processor then computes a 3-D pose correction for the HMD pose based on the pixel offset.

In some embodiments, the processor renders the 3-D HMD model together with the marker and applies an edge filter to the rendered view and the corresponding camera image. Edges in the rendered image and the camera image are then matched to determine a 2-D image offset that provides the best alignment between the edges in the rendered and camera images. Edges in the camera image and the rendered image can be pre-filtered using a Gaussian filter to increase robustness of silhouette matching. Performing matching on the marker and the silhouette of the HMD in this manner has two advantages: (1) matching the edge images rather than the images themselves is less dependent on lighting, whereas an HMD surface is typically shiny and can appear anything from dark to bright, depending on angle and local lighting, and (2) the contributions to the correction from marker and from the silhouette are complementary because the marker edges are most distinguishable from frontal view, whereas the silhouette matching works best when viewed from a side view. The processor can also calculate a 3-D position offset using the focal length of the camera. For example, the processor can calculate the 3D position offset as a world space translation perpendicular to the camera's viewing direction at the distance of the HMD. In addition, the processor can apply a set of algorithms to fade the 3-D correction in and out, in case the marker/silhouette matching temporarily fails or resumes.

Highly visible markers such as Aruco markers can significantly enhance the feature detection techniques described herein. However, these markers can also interfere with the visual appearance of the user or the HMD in the mixed reality scene. Some embodiments of the processor are therefore configured to virtually remove the markers from the mixed reality scene using marker inpainting. The processor can be configured to implement algorithms to detect marker outlines and inpaint the corresponding pixels with that have pixel values corresponding to colors of HMD in the region of the marker. In embodiments that utilize Aruco markers, the marker detection algorithms predict locations of the four edges of the Aruco marker based on the corrected HMD pose. The processor can also refine the edge locations so that they coincide with edges that are detected in corresponding captured images. Refining the edge locations allows the processor to detect locations of the edges even in the presence of motion blur, which can transform a square marker into a rectangular shape or even polygonal shape. The visible surfaces of the HMD are usually a uniform color so that the location of the Aruco marker can be inpainted with a fixed color that is computed as an average of the non-marker pixels surrounding the marker area on the surface of the HMD.

Figure 22:
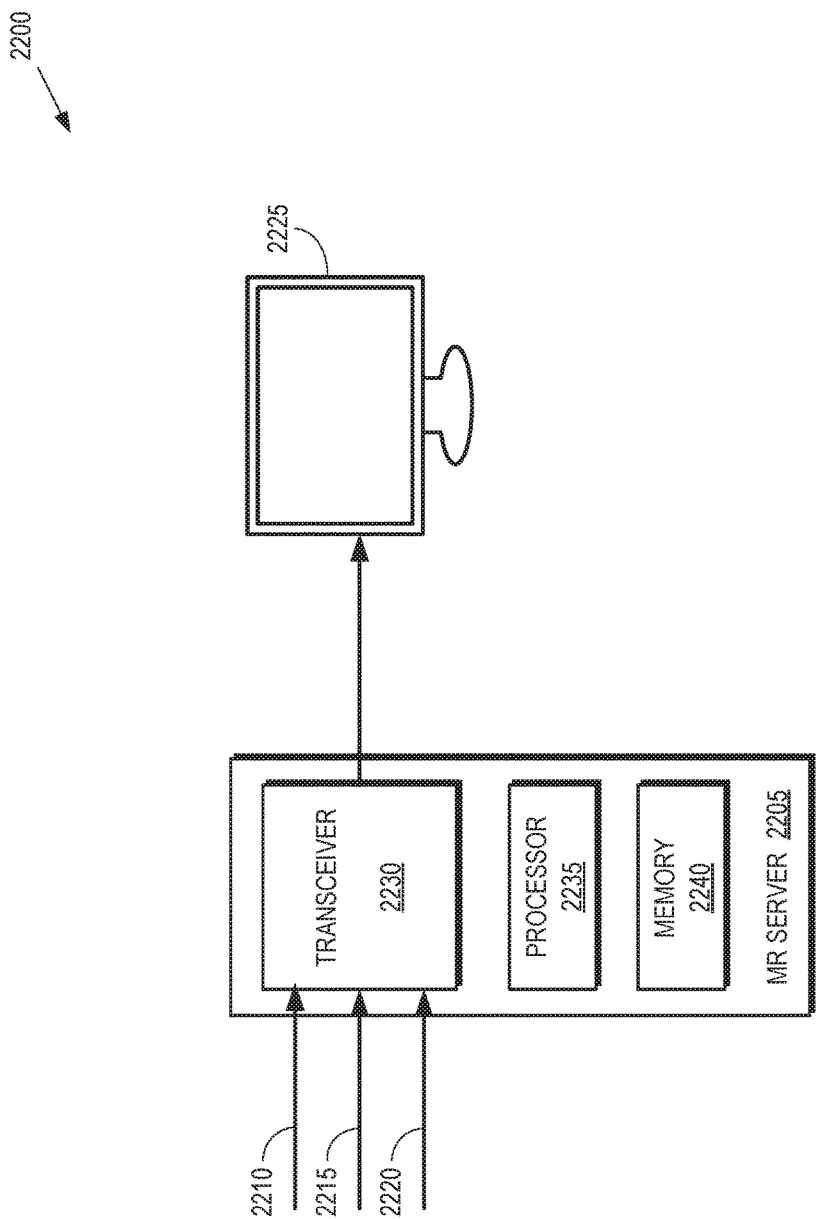
FIG. 22 is a block diagram of a processing system for generating images of an MR scene including a user wearing an HMD according to some embodiments.

FIG. 22 is a block diagram of a processing system 2200 for generating images of an MR scene including a user wearing an HMD according to some embodiments. The processing system 2200 is implemented in some embodiments of the end-to-end system 1600 shown in FIG. 16. The processing system 2200 includes an MR server 2205 that receives temporally synchronized streams including a telemetry stream 2210 of HMD pose information, an eye gaze stream 2215 of information indicating an eye gaze direction for the user, and an image stream 2220 including information representing images captured by a camera. The MR server 2205 can be implemented as a single entity (as shown in FIG. 22) or as a distributed system such as a plurality of servers use to provide cloud services. The processing system 2200 also includes a display 2225 that is used to display the MR images produced by the MR server 2205. Although the display 2225 is depicted as a television or computer monitor in FIG. 22, the display 2225 can also be implemented in other formats such as an HMD, a cell phone, and the like.

The MR server 2205 includes a transceiver 2230 for transmitting and receiving signals. For example, the transceiver 2230 is configured to receive the temporally synchronized streams 2210, 2215, 2220. The transceiver 2230 can be implemented as a single integrated circuit (e.g., using a single ASIC or FPGA) or as a system-on-a-chip (SOC) that includes different modules for implementing the functionality of the transceiver 2230. The MR server 2205 also includes a processor 2235 and a memory 2240. The processor 2235 can be used to execute instructions stored in the memory 2240 and to store information in the memory 2240 such as the results of the executed instructions. For example, the processor 2235 can be configured to implement some embodiments of the method 1800 shown in FIG. 18 or the method 2100 shown in FIG. 21.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method, comprising:
   capturing, using a camera, an image of a user that is wearing a head mounted device (HMD) that occludes a portion of the user's face;
   determining a three-dimensional (3-D) pose that indicates an orientation and a location of the user's face in a camera coordinate system associated with the camera;
   detecting an eye gaze direction of the user;
   accessing texture samples from an eye gaze database based on the eye gaze direction; and
   rendering a representation of the occluded portion of the user's face based on a 3-D model of the user's face and using the texture samples accessed from the eye gaze database, wherein the representation replaces a portion of the HMD in the image based on the 3-D pose of the user's face in the camera coordinate system.

2. The method of claim 1, further comprising:
   determining an initial 3-D pose of the user's face in the camera coordinate system by matching a model of an unoccluded portion of the user's face to an initial image.

3. The method of claim 2, wherein determining the initial 3-D pose of the user's face in the camera coordinate system comprises determining the initial 3-D pose of the user's face in the camera coordinate system in non-real-time using a background thread or pre-process.

4. The method of claim 3, further comprising:
   determining an initial pose of the HMD by matching at least one feature of the HMD to the initial image; and
   determining a first transform of an HMD coordinate system to a camera coordinate system based on an inverse of the initial 3-D pose of the user's face in the camera coordinate system and the initial pose of the HMD.

5. The method of claim 4, further comprising:
   determining a rotation matrix that represents a relative orientation of the user's face and the HMD based on an inverse of the initial pose of the HMD and the initial 3-D pose of the user's face relative to the camera.

6. The method of claim 5, wherein determining the 3-D pose of the user's face in the camera coordinate system comprises determining the 3-D pose of the user's face in the camera coordinate system based on the first transform, a pose of the HMD in the HMD coordinate system, and the rotation matrix.

7. The method of claim 1, wherein determining the 3-D pose of the user's face in the camera coordinate system comprises determining the 3-D pose of the user's face in the camera coordinate system in real time by matching a model of an unoccluded portion of the user's face to the image.

8. The method of claim 7, wherein matching a model of the unoccluded portion of the user's face to the image comprises matching a subset of points in the model to a subset of points in the image.

9. The method of claim 1, further comprising:
   color correcting the texture samples using an affine transformation that maps colors of the texture samples to colors of an unoccluded portion of the user's face in the image.

10. The method of claim 1, wherein rendering the 3-D model of the occluded portion of the user's face comprises rendering the 3-D model of the occluded portion of the user's face using a translucence that varies from a center to an edge of the occluded portion of the user's face.

11. An apparatus, comprising:
    a camera configured to capture an image of a user that is wearing a head mounted device (HMD) that occludes a portion of the user's face;
    an eye gaze tracker configured to detect an eye gaze direction of the user; and a processor configured to determine a three-dimensional (3-D) pose that indicates an orientation and a location of the user's face relative to the camera, access texture samples from an eye gaze database stored in a memory, and render a representation of the occluded portion of the user's face based on a 3-D model of the user's face and using the accessed texture samples, wherein the representation replaces a portion of the HMD in the image based on the 3-D pose.

12. The apparatus of claim 11, wherein the processor is configured to determine an initial 3-D pose of the user's face in a camera coordinate system by matching a model of an unoccluded portion of the user's face to an initial image.

13. The apparatus of claim 12, wherein the processor is configured to determine the initial 3-D pose of the user's face in the camera coordinate system in non-real-time using a background thread or pre-process.

14. The apparatus of claim 13, wherein the processor is configured to:
  determine an initial pose of the HMD by matching at least one feature of the HMD to the initial image; and
  determine a first transform of an HMD coordinate system to a camera coordinate system based on an inverse of the initial 3-D pose of the user's face in the camera coordinate system and the initial pose of the HMD.

15. The apparatus of claim 14, wherein the processor is configured to:
  determine a rotation matrix that represents a relative orientation of the user's face and the HMD based on an inverse of the initial pose of the HMD and the initial 3-D pose of the user's face relative to the camera.

16. The apparatus of claim 15, wherein the processor is configured to determine the 3-D pose of the user's face in the camera coordinate system based on the first transform, a pose of the HMD in the HMD coordinate system, and the rotation matrix.

17. The apparatus of claim 11, wherein the processor is configured to determine the 3-D pose of the user's face in a camera coordinate system in real time by matching a model of an unoccluded portion of the user's face to the image.

18. The apparatus of claim 17, wherein the processor is configured to match a subset of points in the model to a subset of points in the image.

19. The apparatus of claim 13, wherein the processor is configured to color correct the texture samples using an affine transformation that maps colors of the texture samples to colors of an unoccluded portion of the user's face in the image.

20. The apparatus of claim 11, wherein the processor is configured to render the 3-D model of the occluded portion of the user's face using a translucence that varies from a center to an edge of the occluded portion of the user's face.

21. A method, comprising:
  detecting an first portion of a user's face in an image captured by a camera, wherein the user is wearing a head mounted device (HMD) that occludes a second portion of the user's face in the image; and
  rendering a 3-D model of the second portion of the user's face into the image to replace a portion of the HMD in the image, wherein rendering the 3-D model of the second portion includes rendering the 3-D model of the second portion using texture samples accessed from an eye gaze database based on an eye gaze direction of the user and further includes color correcting the texture samples using an affine transformation that maps colors of the texture samples to colors of the first portion of the user's face.

22. The method of claim 21, wherein detecting the first portion of the user's face in the image comprises matching a model of the first portion of the user's face to the image.

23. The method of claim 22, wherein rendering the 3-D model of the second portion of the user's face comprises determining a 3-D pose of the user's face based on a first transform of an HMD coordinate system to a camera coordinate system, a pose of the HMD in an HMD coordinate system, and a rotation matrix that represents a position or orientation of the user's face relative to the HMD.

24. The method of claim 21, wherein rendering the 3-D model of the second portion of the user's face comprises rendering the 3-D model of the second portion of the user's face using a translucence that varies from a center to an edge of the second portion of the user's face.

* * * * *